United States Patent
Ono et al.

(10) Patent No.: US 6,928,126 B2
(45) Date of Patent: *Aug. 9, 2005

(54) RECEPTION INTERFACE UNIT IN TRANSMISSION SYSTEM

(75) Inventors: Kinya Ono, Saitama (JP); Kunihiro Minoshima, Saitama (JP); Hidemi Usuba, Saitama (JP); Sho Murakoshi, Saitama (JP); Makoto Matsumaru, Saitama (JP); Seiichi Hasebe, Saitama (JP)

(73) Assignee: Pioneer Electronic Corporation, Tokyo (JP)

( * ) Notice: Subject to any disclaimer, the term of this patent is extended or adjusted under 35 U.S.C. 154(b) by 107 days.

This patent is subject to a terminal disclaimer.

(21) Appl. No.: 10/410,136

(22) Filed: Apr. 10, 2003

(65) Prior Publication Data

US 2003/0194037 A1 Oct. 16, 2003

Related U.S. Application Data

(63) Continuation of application No. 09/283,759, filed on Apr. 2, 1999, now Pat. No. 6,570,945.

(30) Foreign Application Priority Data

Apr. 3, 1998 (JP) ........................ P. 10-108768

(51) Int. Cl.[7] .............................. H04L 7/02
(52) U.S. Cl. ................ 375/359; 375/362; 375/372; 370/509; 710/129
(58) Field of Search ................ 375/354, 359, 375/360, 362, 365, 368, 369, 372, 376; 370/503, 508, 512, 527, 529; 327/141, 147, 156, 160; 710/117, 129, 130

(56) References Cited

U.S. PATENT DOCUMENTS

| | | | |
|---|---|---|---|
| 5,703,877 | A | 12/1997 | Nuber et al. |
| 5,982,828 | A | 11/1999 | Fujimori et al. |
| 6,069,902 | A | 5/2000 | Kurano et al. |
| 6,078,594 | A | 6/2000 | Anderson et al. |
| 6,115,422 | A | 9/2000 | Anderson et al. |

OTHER PUBLICATIONS

IEEE Standard for High Performance Serial Bus, Aug. 30, 1996.

*Primary Examiner*—Dac V. Ha
(74) *Attorney, Agent, or Firm*—Sughrue Mion, PLLC

(57) ABSTRACT

A reception interface unit in a transmission system wherein time series data is divided into data groups and a data packet with reproduction specification time data specifying a time at which each data piece in the data groups should be reproduced, added to the data groups is transmitted on a transmission bus in a time division manner. The interface unit has a cycle timer for counting the reference time of the home device based on the reference time on the transmission bus, a unit for extracting the reproduction specification time data in the data groups from a signal received via the transmission bus and storing the reproduction specification time data in a buffer, a reception buffer for inputting and storing the data pieces in the data groups in order and reading out the data pieces in the storage order responsive to a reproduction clock, a match detector for generating a reference clock pulse if the reference time of the home device matches the reproduction specification time, and a PLL circuit being responsive to the reference clock pulse for generating a clock signal which is phase synchronized with the reference clock pulse as the reproduction clock. When the reference time on the transmission bus changes, the data stored in the buffer in the reproduction specification time data extraction unit and the data stored in the reception buffer are all deleted.

18 Claims, 23 Drawing Sheets

CS : CYCLE START PACKET
I1, I2 : ISOCHRONOUS PACKET

FIG. 7

| SID | DBS | FN | OPC | Rsv | DBC |
|-----|-----|-----|-----|-----|-----|
| FMT | FDF |   | SYT |   |   |

SPH comprises FN, OPC, Rsv, DBC

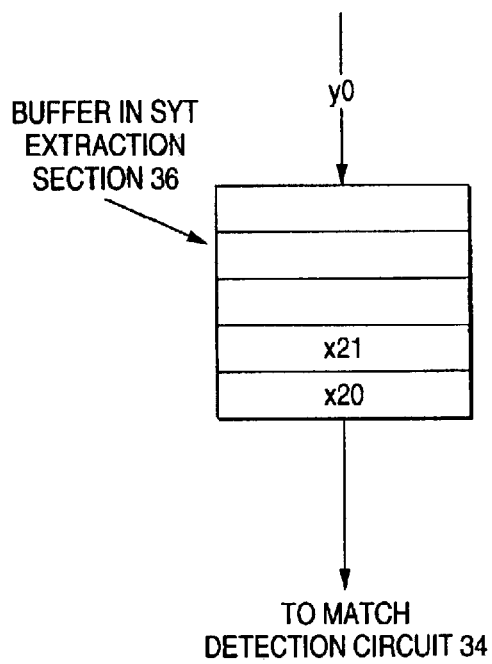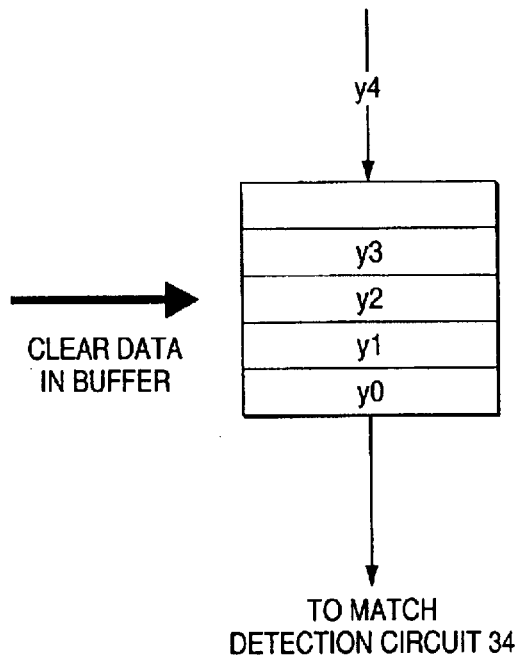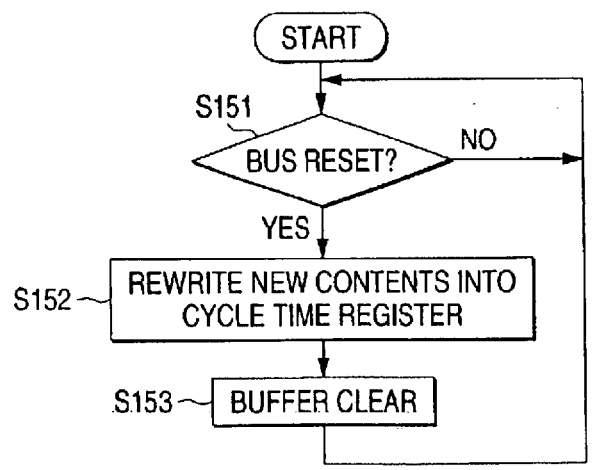

BUFFER IN SYT EXTRACTION SECTION 36

TO MATCH DETECTION CIRCUIT 34

CALCULATE DIFFERENCE BETWEEN SYTS

TO MATCH DETECTION CIRCUIT 34

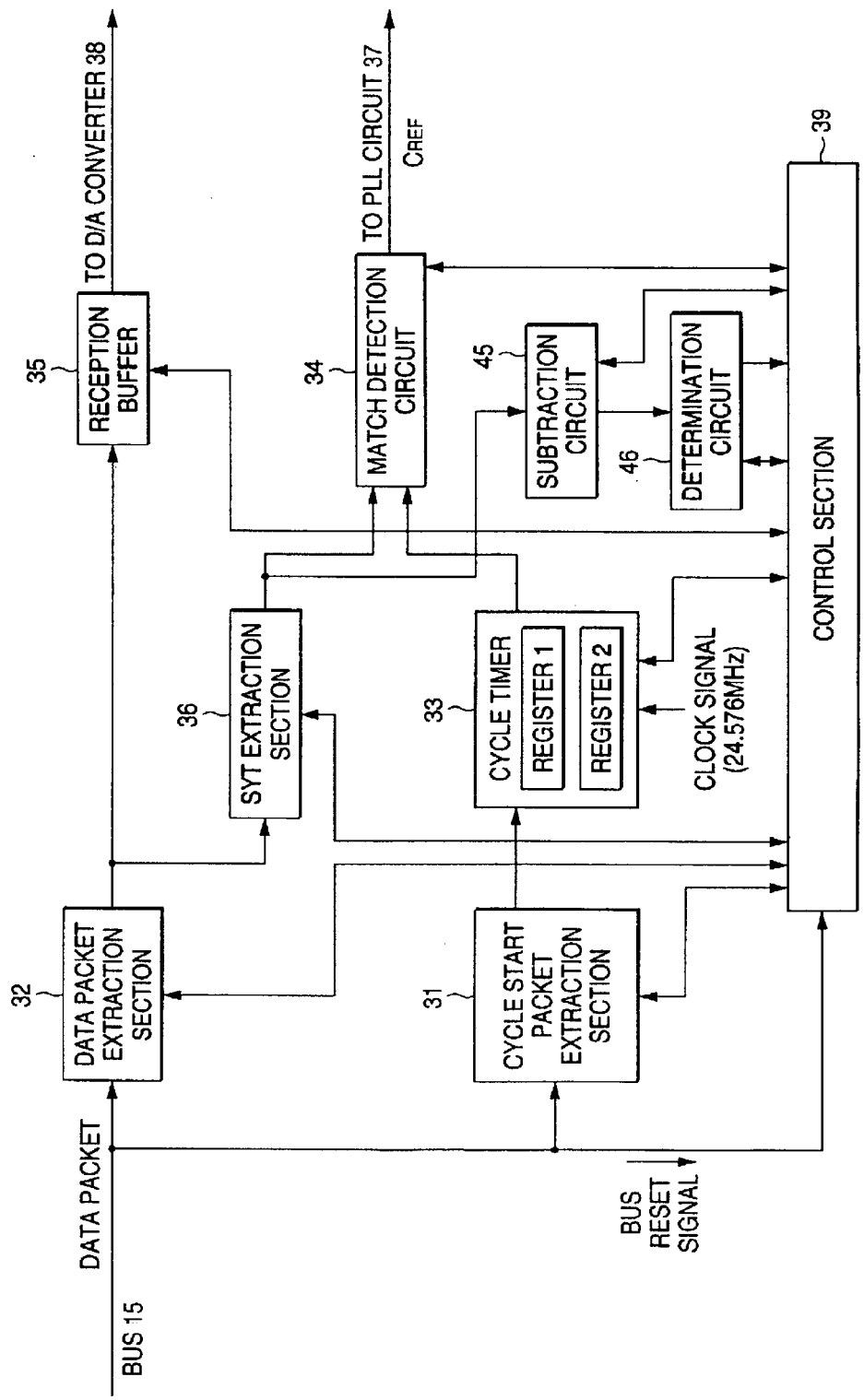

RECEPTION INTERFACE UNIT IN TRANSMISSION SYSTEM

CROSS REFERENCE TO RELATED APPLICATION

This is a continuation of application Ser. No. 09/283,759 filed Apr. 2, 1999, now U.S. Pat. No. 6,570,945; the disclosure of which is incorporated herein by reference.

BACKGROUND OF THE INVENTION

1. Field of the Invention

This invention relates to a reception interface unit in a transmission system for putting time series digital data into a data packet and transferring the data packet at high speed.

2. Description of the Related Art

IEEE1394-1995 standard has been proposed as an interface standard for transferring time series data of audio signals, video signals, etc., in a data packet at high speed between electric devices such as audio devices, video devices, computers, etc.

However, in a data transfer system based on the IEEE1394-1995 standard, it is conceivable that received digital data cannot be reproduced at proper timing over a considerable period of time in a receiving party because of a change in the reference time in the system, a malfunction, etc.

SUMMARY OF THE INVENTION

The present invention has been made to solve the above problem, and therefore an object of the invention is to provide a reception interface unit in a transmission system for enabling digital data sent by a transmitting party to be restored to a state in which the data can be reproduced immediately at proper timing in a receiving party.

To achieve the above object, according to a first aspect of the invention, there is provided a reception interface unit in a transmission system wherein time series data is divided into data groups and a data packet comprising reproduction specification time data specifying the time at which each data piece in the data groups should be reproduced, added to the data groups is transmitted on a transmission bus in a time division manner, the reception interface unit comprising a cycle timer for counting the reference time of a home device based on the reference time on the transmission bus, reproduction specification time data extraction means for extracting the reproduction specification time data in the data groups from a signal received via the transmission bus and storing the reproduction specification time data in a buffer, a reception buffer for inputting and storing the data pieces in the data groups in order and reading out the data pieces in the storage order in response to a reproduction clock, a match detection means for generating a reference clock pulse if the reference time of the home device matches the reproduction specification time, and a PLL circuit being responsive to the reference clock pulse for generating a clock signal which is phase synchronized with the reference clock pulse as the reproduction clock, wherein when the reference time on the transmission bus changes, the data stored in the buffer in the reproduction specification time data extraction means and the data stored in the reception buffer are all deleted.

According to a second-aspect of the invention, there is provided a reception interface unit in a transmission system wherein time series data is divided into data groups and a data packet comprising reproduction specification time data specifying the time at which each data piece in the data groups should be reproduced, added to the data groups is transmitted on a transmission bus in a time division manner, the reception interface unit comprising a cycle timer for counting the reference time of the home device based on the reference time on the transmission bus, the cycle timer having at least two registers for temporarily storing the reference time of the home device before the reference time on the transmission bus changes and the reference time of the home device after the reference time on the transmission bus changes, reproduction specification time data extraction means for extracting the reproduction specification time data in the data groups from a signal received via the transmission bus and storing the reproduction specification time data in a buffer, a reception buffer for inputting and storing the data pieces in the data groups in order and reading out the data pieces in the storage order in response to a reproduction clock, a match detection means for generating a reference clock pulse if the reference time of the home device matches the reproduction specification time, and a PLL circuit being responsive to the reference clock pulse for generating a clock signal which is phase synchronized with the reference clock pulse as the reproduction clock, characterized in that when the buffer becomes empty of the data stored before the reference time on the transmission bus changes, either or both of the reproduction specification time data extraction means and the reception buffer output a control signal, that when the reference time on the transmission bus changes, the reproduction specification time data extraction means and the reception buffer interrupt write of the data and when each buffer becomes empty of the data stored before the reference time on the transmission bus changes, restarts write of the data, and that the cycle timer changes the reference time of the home device from the reference time of the home device before the reference time on the transmission bus changes to that after the reference time on the transmission bus changes based on the control signal and outputs the reference time of the home device to the match detection circuit.

According to a third aspect of the invention, there is provided a reception interface unit in a transmission system wherein time series data is divided into data groups and a data packet comprising reproduction specification time data specifying the time at which each data piece in the data groups should be reproduced, added to the data groups is transmitted on a transmission bus in a time division manner, the reception interface unit comprising a cycle timer for counting the reference time of the home device based on the reference time on the transmission bus, reproduction specification time data extraction means for extracting the reproduction specification time data in the data groups from a signal received via the transmission bus and storing the reproduction specification time data in a buffer, a reception buffer for inputting and storing the data pieces in the data groups in order and reading out the data pieces in the storage order in response to a reproduction clock, a match detection means for generating a reference clock-pulse if the reference time of the home device matches the reproduction specification time, and a PLL circuit being responsive to the reference clock pulse for generating a clock signal which is phase synchronized with the reference clock pulse as the reproduction clock, characterized in that when the reference time on the transmission bus changes, the reproduction specification time data extraction means deletes all the reproduction specification time data stored in the buffer.

According to a fourth aspect of the invention, there is provided a reception interface unit in a transmission system wherein time series data is divided into data groups and a data packet comprising reproduction specification time data specifying the time at which each data piece in the data groups should be reproduced, added to the data groups is transmitted on a transmission bus in a time division manner, the reception interface unit comprising a cycle timer for counting the reference time of the home device based on the reference time on the transmission bus, reproduction specification time data extraction means for extracting the reproduction specification time data in the data groups from a signal received via the transmission bus and storing the reproduction specification time data in a buffer, dummy reproduction specification time data generation means for generating dummy reproduction specification time data from the reproduction specification time data extracted in the reproduction specification time data extraction means, selection means for selectively outputting either of the reproduction specification time data from the reproduction specification time data extraction means and the dummy reproduction specification time data from the dummy reproduction specification time data generation means, a reception buffer for inputting and storing the data pieces in the data groups in order and reading out the data pieces in the storage order in response to a reproduction clock, a match detection means for generating a reference clock pulse if the reference time of the home device matches the reproduction specification time output from the selection means, and a PLL circuit being responsive to the reference clock pulse for generating a clock signal which is phase synchronized with the reference clock pulse as the reproduction clock, characterized in that the selection means selects the reproduction specification time data from the reproduction specification time data extraction means before the reference time on the transmission bus changes and selects the dummy reproduction specification time data from the dummy reproduction specification time data generation means after the reference time on the transmission bus changes.

According to a fifth aspect of the invention, the reception interface unit as set forth in the fourth aspect of the invention further includes subtraction means for finding a difference between the reproduction specification time data extracted in the reproduction specification time data extraction means just before the reference time on the transmission bus changes and the reproduction specification time data extracted in the reproduction specification time data extraction means just after the reference time changes and outputting the found time difference to the dummy reproduction specification time data generation means, wherein when the reference time on the transmission bus changes, the dummy reproduction specification time data generation means adds the time difference to, the reproduction specification time data stored in the buffer in the reproduction specification time data extraction means before the reference time changes to generate dummy reproduction specification time data.

According to a sixth aspect of the invention, in the invention of the fourth or fifth aspect, when the buffer becomes empty of the data stored before the reference time on the transmission bus changes, either or both of the reproduction specification time data extraction means and the reception buffer output a control signal, and the selection means selects the reproduction specification time data from the reproduction specification time data extraction means based on the control signal.

According to a seventh aspect of the invention, there is provided a reception interface unit in a transmission system wherein time series data is divided into data groups and a data packet comprising reproduction specification time data specifying the time at which each data piece in the data groups should be reproduced, added to the data groups is transmitted on a transmission bus in a time division manner, the reception interface unit comprising a cycle timer for counting the reference time of the home device based on the reference time on the transmission bus, reproduction specification time data extraction means for extracting the reproduction specification time data in the data groups from a signal received via the transmission bus and storing the reproduction specification time data in a buffer, a reception buffer for inputting and storing the data pieces in the data groups in order and reading out the data pieces in the storage order in response to a reproduction clock, a match detection means for generating a reference clock pulse if the reference time of the home device matches the reproduction specification time, dummy reference clock pulse generation means for generating a dummy reference clock pulse based on the period of the reference clock pulse, selection means for selectively outputting either the dummy reference clock pulse from the dummy reference clock pulse generation means and the reference clock pulse from the match detection means, and a PLL circuit being responsive to the reference clock pulse for generating a clock signal which is phase synchronized with the reference clock pulse as the reproduction clock, characterized in that the selection means selects the reference clock pulse from the match detection means before the reference time on the transmission bus changes and selects the dummy reference clock pulse from the dummy reference clock pulse generation means after the reference time on the transmission bus changes.

According to an eighth aspect of the invention, in the invention of the seventh aspect, the dummy reference clock pulse generation means has a counter for measuring the period of the reference clock pulse and generates the dummy reference clock pulse based on the measurement value.

According to a ninth aspect of the invention, in the invention of the seventh or eighth aspect, when the buffer becomes empty of the data stored before the reference time on the transmission bus changes, either or both of the reproduction specification time data extraction means and the reception buffer output a control signal, and the selection means selects the reference clock pulse from the match detection means based on the control signal.

According to a tenth aspect of the invention, there is provided a reception interface unit in a transmission system wherein time series data is divided into data groups and a data packet comprising reproduction specification time data specifying the time at which each data piece in the data groups should be reproduced, added to the data groups is transmitted on a transmission bus in a time division manner, the reception interface unit comprising a cycle timer for counting the reference time of the home device based on the reference time on the transmission bus, the cycle timer having at least two registers for temporarily storing the reference time of the home device before the reference time on the transmission bus changes and the reference time of the home device after the reference time on the transmission bus changes, reproduction specification time data extraction means for extracting the reproduction specification time data in the data groups from a signal received via the transmission bus and storing the reproduction specification time data, a reception buffer for inputting and storing the data pieces in the data groups in order and reading out the data pieces in the storage order in response to a reproduction clock, a match detection means for generating a reference clock pulse if the reference time of the home device matches the reproduction specification time, and a PLL circuit being responsive to the reference clock pulse for generating a clock signal which is phase synchronized with the reference clock pulse as the reproduction clock, characterized in that the cycle timer outputs the reference time of the home device stored before the reference time on the transmission bus changes for the data stored in the reproduction specification time data extraction means and the reception buffer before the reference time on the transmission bus changes and outputs the reference time of the home device stored after the reference time on the transmission bus changes for the data stored in the reproduction specification time data extraction means and the reception buffer after the reference time on the transmission bus changes.

According to an eleventh aspect of the invention, the reception interface unit as set forth in the tenth aspect of the invention further includes subtraction means for finding a time difference between reproduction specification time data output from the reproduction specification time data extraction means and reproduction specification time data output from the reproduction specification time data extraction means immediately preceding that reproduction specification time data and a determination circuit for determining whether reproduction specification time data is reproduction specification time data stored before or after the reference time on the transmission bus changes based on the time difference found by the subtraction means, wherein the cycle timer is responsive to the determination result of the determination circuit for selectively outputting the reference time of the home device before the reference time on the transmission bus changes or the reference time of the home device after the reference time on the transmission bus changes to the match detection circuit.

According to a twelfth aspect of the invention, in the invention as set forth in the eleventh aspect, when the buffer becomes empty of the data stored before the reference time on the transmission bus changes, either or both of the reproduction specification time data extraction means and the reception buffer output a control signal, and the cycle timer selectively outputs the reference time of the home device before the reference time on the transmission bus changes or the reference time of the home device after the reference time on the transmission bus changes to the match detection circuit based on the control signal.

In the first aspect of the invention, when the reference time on the transmission bus changes, the data stored in the buffer in the reproduction specification time data extraction means and the data stored in the reception buffer are all deleted. Thus, after the reference time on the transmission bus changes, the digital data after the reference time changes can be reproduced immediately at proper timing in the receiving party.

In the second aspect of the invention, when the buffer becomes empty of the data stored before the reference time on the transmission bus changes, either or both of the reproduction specification time data extraction means and the reception buffer output a control signal, when the reference time on the transmission bus changes, the reproduction specification time data extraction means and the reception buffer interrupt write of the data and when each buffer becomes empty of the data stored before the reference time on the transmission bus changes, restart write of the data, and the cycle timer changes the reference time of the home device from the reference time of the home device before the reference time on the transmission bus changes to that after the reference time on the transmission bus changes based on the control signal and outputs the reference time of the home device to the match detection circuit. Thus, in the receiving party, after the reference time on the transmission bus changes, the digital data before the reference time on the transmission bus changes can be reproduced immediately at proper timing and then subsequently the digital data after the reference time on the transmission bus changes can be reproduced.

In the third aspect of the invention, when the reference time on the transmission bus changes, the reproduction specification time data extraction means deletes all the reproduction specification time data stored in the buffer. Thus, after the reference time on the transmission bus changes, the digital data before and after the reference time on the transmission bus changes can be reproduced immediately at proper timing in the receiving party.

In the fourth aspect of the invention, the selection means selects the reproduction specification time data from the reproduction specification time data extraction means before the reference time on the transmission bus changes and selects the dummy reproduction specification time data from the dummy reproduction specification time data generation means after the reference time on the transmission bus changes.

In the fifth aspect of the invention, the reception interface unit further includes subtraction means for finding a difference between the reproduction specification time data extracted in the reproduction specification time data extraction means just before the reference time on the transmission bus changes and the reproduction specification time data extracted in the reproduction specification time data extraction means just after the reference time on the transmission bus changes and outputting the found time difference to the dummy reproduction specification time data generation means, wherein when the reference time on the transmission bus changes, the dummy reproduction specification time data generation means adds the time difference to the reproduction specification time data stored in the buffer in the reproduction specification time data extraction means before the reference time on the transmission bus changes to generate dummy reproduction specification time data.

In the sixth aspect of the invention, when the buffer becomes empty of the data stored before the reference time on the transmission bus changes, either or both of the reproduction specification time data extraction means and the reception buffer output a control signal, and the selection means selects the reproduction specification time data from the reproduction specification time data extraction means based on the control signal. Thus, after the reference time on the transmission bus changes, the digital data before and after the reference time on the transmission bus changes can be reproduced immediately at proper timing in the receiving party.

In the seventh aspect of the invention, the selection means selects the reference clock pulse from the match detection means before the reference time on the transmission bus changes and selects the dummy reference clock pulse from the dummy reference clock pulse generation means after the reference time on the transmission bus changes.

In the eighth aspect of the invention, the dummy reference clock pulse generation means has a counter for measuring the period of the reference clock pulse and generates the dummy reference clock pulse based on the measurement value.

In the ninth aspect of the invention, when the buffer becomes empty of the data stored before the reference time on the transmission bus changes, either or both of the reproduction specification time data extraction means and the reception buffer output a control signal, and the selection means selects the reference clock pulse from the match detection means based on the control signal. Thus, after the reference time on the transmission bus changes, the digital data before and after the reference time on the transmission bus changes can be reproduced immediately at proper timing in the receiving party.

In the tenth aspect of the invention, the cycle timer outputs the reference time of the home device stored before the reference time on the transmission bus changes for the data stored in the reproduction specification time data extraction means and the reception buffer before the reference time on the transmission bus changes and outputs the reference time of the home device stored after the reference time on the transmission bus changes for the data stored in the reproduction specification time data extraction means and the reception buffer after the reference time on the transmission bus changes.

In the eleventh aspect of the invention, the reception interface unit further includes subtraction means for finding a time difference between reproduction specification time data output from the reproduction specification time data extraction means and reproduction specification time data output from the reproduction specification time data extraction means immediately preceding that reproduction specification time data and a determination circuit for determining whether reproduction specification time data is reproduction specification time data stored before or after the reference time on the transmission bus changes based on the time difference found by the subtraction means, wherein the cycle timer is responsive to the determination result of the determination circuit for selectively outputting the reference time of the home device before the reference time on the transmission bus changes or the reference time of the home device after the reference time on the transmission bus changes to the match detection circuit.

In the twelfth aspect of the invention, when the buffer becomes empty of the data stored before the reference time on the transmission bus changes, either or both of the reproduction specification time data extraction means and the reception buffer output a control signal, and the cycle timer selectively outputs the reference time of the home device before the reference time on the transmission bus changes or the reference time of the home device after the reference time on the transmission bus changes to the match detection circuit based on the control signal. Thus, after the reference time on the transmission bus changes, the digital data before and after the reference time on the transmission bus changes can be reproduced immediately at proper timing in the receiving party.

BRIEF DESCRIPTION OF THE DRAWINGS

In the accompanying drawings:

FIG. 7 is a drawing to show the format of a CIP header;

FIGS. 14A and 14B are schematic drawings to show a first embodiment of the invention;

FIG. 15 is a flowchart to show the first embodiment of the invention;

FIG. 31 is a block diagram of the fifth embodiment of the invention.

DETAILED DESCRIPTION OF THE PREFERRED EMBODIMENTS

Referring now to the accompanying drawings, there are shown preferred embodiments of the invention.

Figure 1:
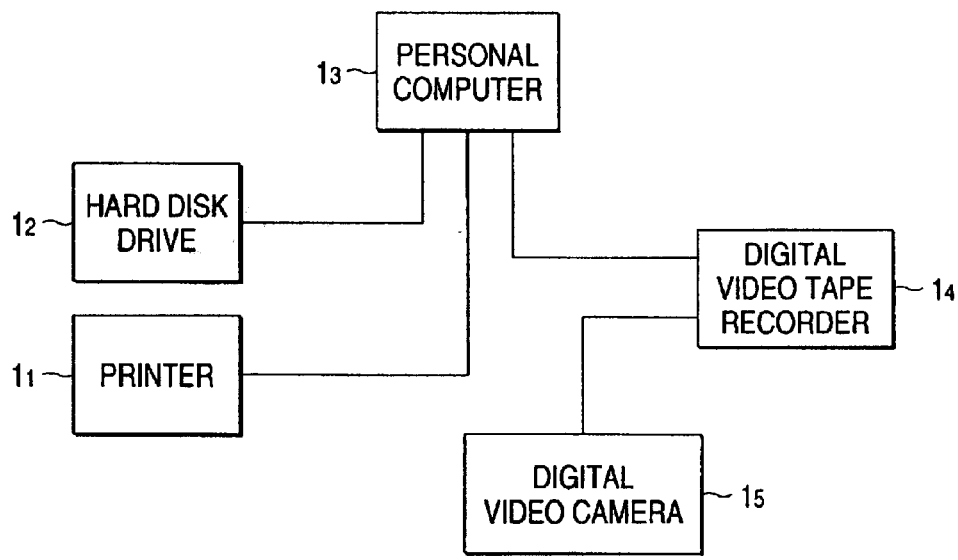
FIG. 1 is a drawing to show electric devices connected by a high-speed serial data transfer interface.

FIG. 1 shows a data transfer system incorporating the invention. The data transfer system includes a high-speed serial data transfer interface based on the IEEE1394-1995 standard, wherein a plurality of electric devices $1_1$ to $1_5$ are detachably connected using cables and connectors in a daisy chain manner and a branch manner. The electric devices $1_1$ to $1_5$ refer to devices for inputting or outputting digital data, such as digital video tape recorders, digital video disc players, personal computers, digital video cameras, hard disk drives, scanners, and printers. That is, the electric devices include not only personal computers and peripheral devices connected thereto, but also household electric devices for inputting or outputting digital data. If each of the electric devices $1_1$ to $1_5$ is connected only at the termination of the daisy chain, it may include one connector jack; a device enabling the daisy chain manner includes two connector jacks and a device enabling the branch manner includes three or more connector jacks. A connector plug connected to a connector jack is provided at either end of each cable. A path provided by the cables for connecting the devices is a data transfer bus.

Next, a data transfer protocol of the IEEE1394-1995 standard will be discussed. In this protocol, electric devices are referred to as nodes, which are given node IDs for discriminating the electronic devices from each other. The node is either a branch node or a leaf node. That is, the branch node is a node connected to two or more nodes and the leaf node is a termination node connected only to one node. In a state in which a number of nodes are connected, a bus reset signal is generated when power is turned on, when an additional node is connected to the bus, or when any node is disconnected from the bus. After the bus is reset, a root node is determined among the nodes.

First, a root node determination method will be discussed.

Each of the nodes connected on the bus determines which of branch and leaf nodes the home device is, and detects topology of the nodes as information.

The node which determines that the home device is a leaf node sends a signal parent notify indicating a notification from a child node to a parent node to a branch node. The node which receives the signal parent notify returns a signal child notify indicating a notification from a parent node to a child node to the leaf node, whereby the parent-child relationship between the nodes containing the leaf node is determined. After this, since neither the signal parent notify nor the signal child notify is transferred between branch nodes, the branch nodes recognize that a parent-child relationship is not determined, and each sends a signal parent notify to the other. When each of the two branch nodes sending the signal to the other judges reception of the signal, the branch nodes set different times individually. One branch node in which the setup time has elapsed first sends a signal parent notify to the other. Since the other receives the signal parent notify from one branch node before the expiration of the setup time, the parent-child relationship between the two branch nodes is determined. The parent node between two branch nodes with their parent-child relationship thus last determined becomes the root node.

Figure 2:
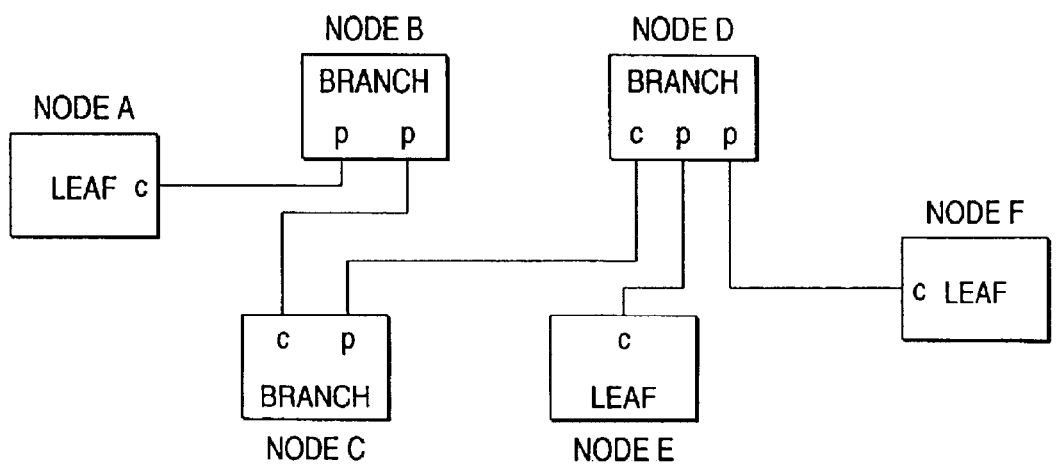
FIG. 2 is a drawing to describe a root node determination method in topology in which nodes A to F are connected.

For example, in topology in which nodes A to F are connected as shown in FIG. 2, the leaf nodes A, E, and F are first determined to be child nodes. A port of each of the leaf nodes A, E, and F corresponds to a child node as indicated by c, and one port of the branch node B and two ports of the branch node D to which the leaf nodes are connected correspond to parent nodes as indicated by p. Next, between the branch nodes C and D, the node C has two undetermined ports and thus the branch node D first sends parent notify to the branch node C, because the node which has one undetermined port shall first send parent notify. Therefore, at this point in time, the remaining one port of the branch node D corresponds to child node c and one port of the branch node C corresponds to parent node p.

Last, between the branch nodes B and C, both the nodes have one undetermined port and each sends parent notify to the other. At this time, as described above, when each of the two branch nodes sending the signal to the other judges reception of parent notify, the branch nodes set different times individually. In the example, the branch node C, which first reaches the setup time, sends parent notify to the branch node B. Since the branch node B receives parent notify from one branch node before the expiration of the setup time, the parent-child relationship between the two branch nodes is determined. That is, the other port of the branch node C corresponds to child node c and the port of the branch node B corresponds to parent node p. The node B which becomes the parent node between the two branch nodes with their parent-child relationship thus last determined becomes the root node.

Next, a method of giving node IDs to nodes will be discussed in detail.

First, the root node sends node ID to each node. In this process, the node IDs starting at the lowest number (node number 0) are set starting at a leaf node (terminal) in the port number order of the ports to which child nodes are connected. The root node is assigned the node ID of the highest node number.

Figure 3:
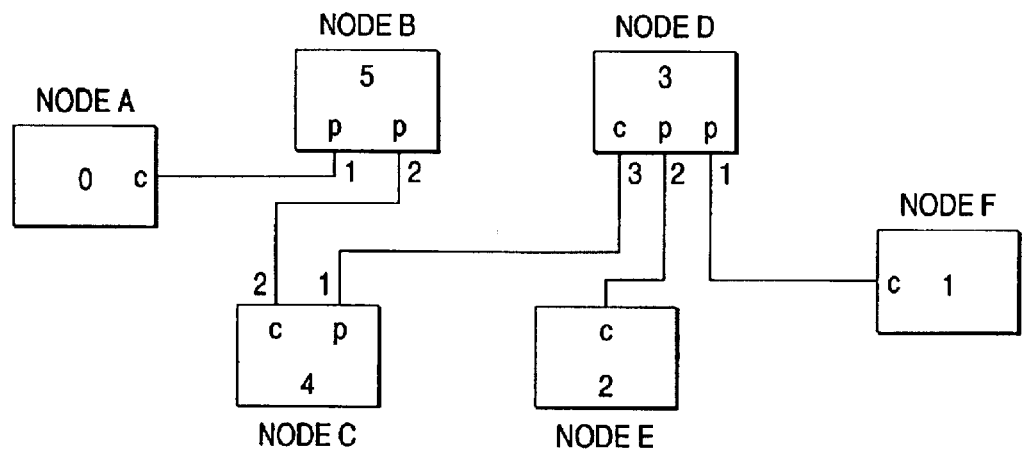
FIG. 3 is a drawing to describe a procedure of giving node IDs to nodes.

For example, in the topology in FIG. 2, node IDs are given as shown in FIG. 3. The node ID giving method is as follows: First, the node B, which is the root node, sends a signal grant for giving node ID number to the node A connected to the port assigned the lowest port number in the device of the node B. In FIG. 2, the numbers indicated near the bus connection terminals are port numbers. After receiving the signal grant, the node A is assigned the node ID number, then returns an acknowledge signal indicating that the number is assigned to the parent node. After this, the node A sends the node ID number of the home device (ID=0) to all nodes.

Upon reception of the ID number, every node increments a node counter of the home device (ID counter=0).

Next, the root node B sends a signal grant for giving node ID number to the node C connected to the port assigned the second lowest port number in the device of the node B. The node C sends a signal grant for giving node ID number to the node D connected to the port assigned the lowest port number in the device of the node C. The node D sends a signal grant for giving node ID number to the node F connected to the port assigned the lowest port number in the device of the node D. After receiving the signal grant, the node F is assigned the node ID number, then returns an acknowledge signal indicating that the number is assigned to the parent node D. After this, the node F sends the node ID-number of the home device (ID=1) to all nodes.

Upon reception of the ID number, every node increments the node counter of the home device (ID counter=1).

Next, the node D sends a signal grant for giving node ID number to the node E connected to the port assigned the second lowest port number in the device of the node D. Hereinafter, the node ID numbers of the devices will be given in the above-described order, as in FIG. 3.

Upon completion of giving the node IDs, a bus manager is selected from among nodes for performing isochronous band control, isochronous channel control, power control, and topology mapping and speed mapping management. This topic will not be discussed in detail here.

Figure 4:
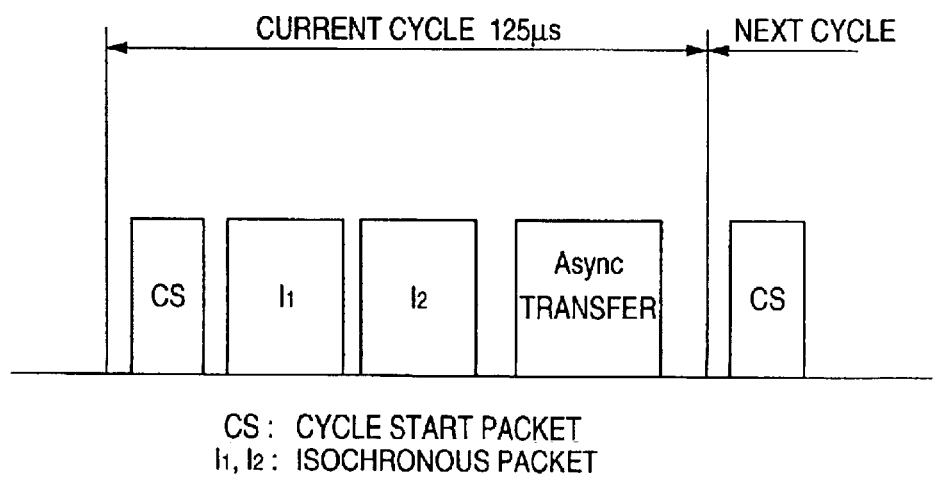
FIG. 4 is a drawing to show a packet composition in a cycle.

Isochronous transfer and asynchronous transfer are executed as data transfer. The isochronous transfer is executed for transferring synchronous data which needs to be transmitted periodically and the asynchronous transfer is executed for transferring asynchronous data. One cycle of data transfer is 125 μsec; in each cycle, a cycle start packet CS, isochronous packets $I_1$ and $I_2$, and an asynchronous packet (Async transfer) are positioned in order as shown in FIG. 4. The cycle start packet CS is transferred from a cycle master node (for example, the root node) to all nodes and indicates the start of the data transfer cycle.

Figure 5:
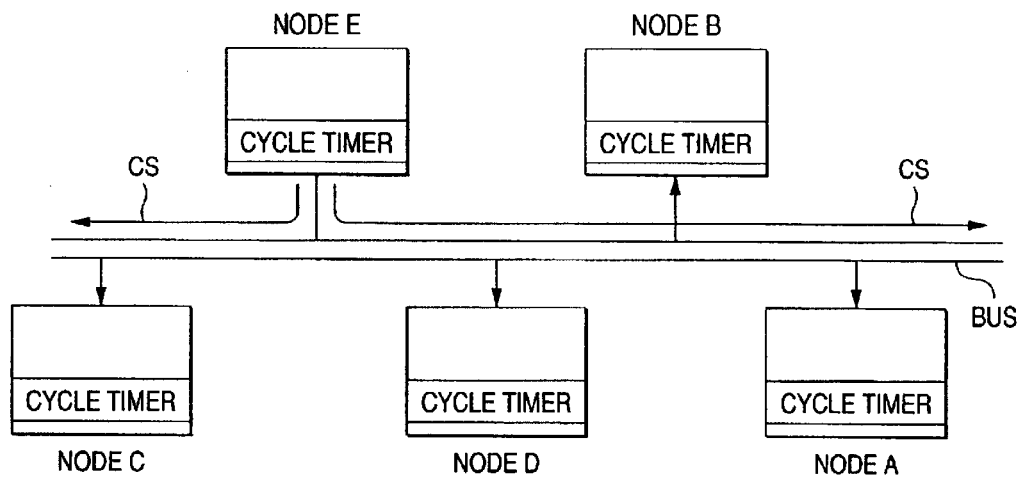
FIG. 5 is a drawing to show transfer of a cycle start packet CS.

Assuming that five nodes A to E are connected to a bus based on the IEEE1394-1995 standard, for example, as shown in FIG. 5, each of the nodes A–E includes a cycle timer for counting at a frequency of 24.576 MHz and providing a time value, and data is transmitted and received at the count timing of the cycle timer. If the node E is the master node, it sends a cycle start packet CS onto the bus for supply to the nodes A to D every 125 μs. The cycle start packet CS indicates the time value of the cycle timer of the node E and each of the nodes A–D receives the cycle start packet CS and makes the time value of the cycle timer of the node equal to the time value of the cycle timer of the node E (reference time), whereby the data transmission/reception operation timings of all nodes A to E connected to the bus are synchronized.

Figure 6:
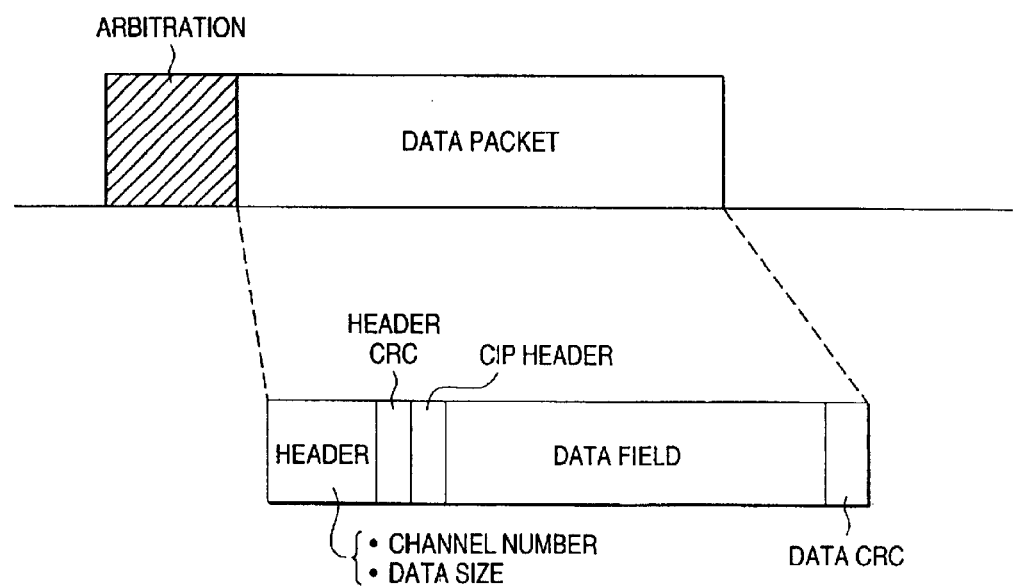
FIG. 6 is a drawing to show the structure of an isochronous packet.

The isochronous packet is an isochronous transfer packet and the units of isochronous packets transferred in one isochronous packet cycle are called channels. In FIG. 4, the packets $I_1$ an $I_2$ of two channels are shown; the number of packets is set for each cycle and packets of channels are time division multiplexed. A node for transferring data in isochronous packets can send a data packet once every 125 μs if it previously executes a reservation procedure and gets a channel. Specifically, as shown in FIG. 6, the isochronous packet consists of arbitration and a data packet. The arbitration is data for asking the root node for the bus use right and getting use permission before data transfer. If any node gets use permission, immediately the root node supplies a signal indicating the fact to each node. If user permission is gotten, the data packet is sent. It has a header, header CRC, a CIP header, a data field, and data CRC in time sequence. The header contains a channel number indicating the type of data transferred in the isochronous packet, a data size indicating the time length of the data, etc., as information. The channel numbers are 0 to 63.

The format of the CIP header is as shown in FIG. 7. It will be discussed briefly. SID is a field for giving a transmitter ID number. DBS is the size of one sample data piece (data block). FN, QPC, and SPH are fields required for sending video data such as MPEG data, for example. FN is a numeric value indicating how many data blocks a source packet is divided into to convert the source packet into IEEE1394 packet, QPC is the number of dummy quadrats added to set the size of the source packet to a DBS multiple (one quadrate is four bytes), and SPH is a field for giving one to the data packet containing a source packet header. Rsv is reservation and DBC is a field for giving consecutive number of sample data. The DBC indicated in the CIP header is the number of the first sample data in data packet.

Next, FMT is format ID and is a field given in response to a data protocol; for example, for A&M (Audio/Music) protocol, A&M protocol format information is given. FDF is a field pursuant to the FMT; for example, for A&M (Audio/Music) protocol, the sampling frequency of each data, etc., is given.

SYT indicates the demodulating time of the packet data in the receiving party and is time stamp data (reproduction specification time data). This reproduction specification time data SYT is made up of the low-order 16 bits of the CIP header. The high-order four bits of the low-order 16 bits are called a cycle count for counting every Iso cycle (125 μs) and the low-order 12 bits are called a cycle offset for counting at a clock of 24.576 MHz.

Figure 8:
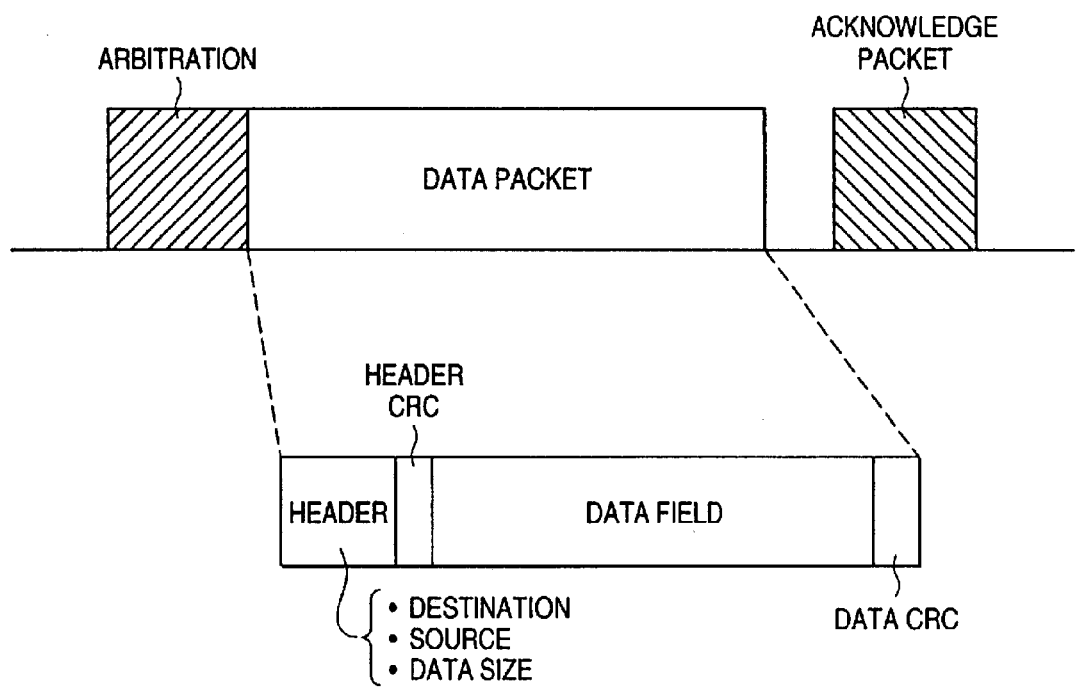
FIG. 8 is a drawing to show the structure of an asynchronous packet.

The asynchronous packet is a packet for transferring data with a transfer destination specified. The transfer destination is a specific node or all nodes on the bus. Specifically, as shown in FIG. 8, the asynchronous packet consists of arbitration, a data packet, and an acknowledge packet. The arbitration is data for asking the root node for the bus use right and getting use permission before data transfer. The data packet has a header, header CRC, a data field, and data CRC in time sequence. The header contains the node ID of the destination of the data transferred in the asynchronous packet, the node ID of the source, a data size indicating the time length of the data, etc., as information. It has a header, header CRC, a CIP header, a data field, and data CRC in time sequence. The header contains a channel number indicating the type of data transferred in the isochronous packet, a data size indicating the time length of the data, etc., as information. The acknowledge packet is a packet returned to the source node by the destination node which receives the data transferred in the asynchronous packet and acknowledges the data reception.

Figure 9:
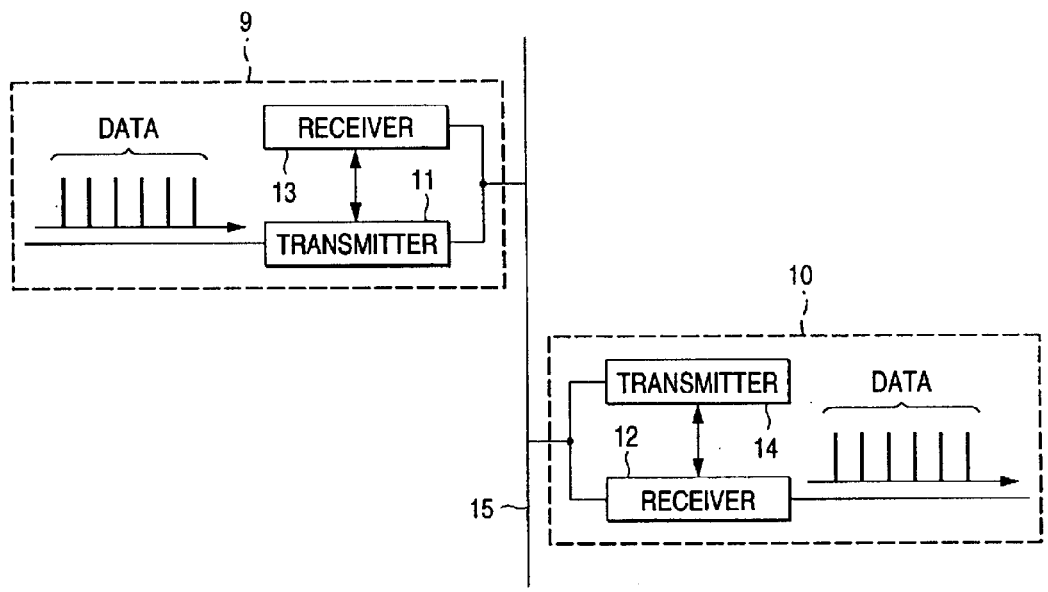
FIG. 9 is a drawing to show a connection state of electric devices containing transmitters and receivers.

Next, an audio data transfer method in an isochronous packet will be discussed. As shown schematically in FIG. 9, assume that audio data DATA of time series digital data with sampling frequency fs, for example, 44.1 kHz is supplied from a transmitter 11 in one electric device 9 to a receiver 12 in another electric device 10 via a bus 15 based on the IEEE1394-1995 standard. The electric device 9 contains a receiver 13 similar to the receiver 12 and the electric device 10 contains a transmitter 14 similar to the transmitter 11.

Figure 10:
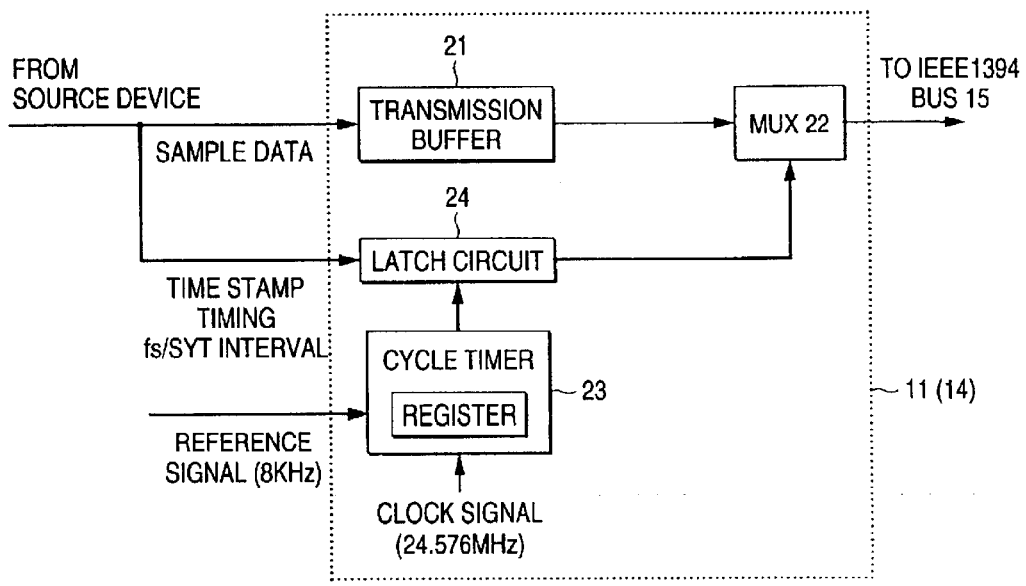
FIG. 10 is a block diagram to show the configuration of the transmitter.

In the transmitter 11 (14), as shown in FIG. 10, sample data of digital data is stored in a transmission buffer 21 in sequence. The stored data is converted into a data packet by an MUX (multiplexer) 22, then output to the bus 15. The operation of the transmission buffer 21 and the MUX 22 is controlled by a microcomputer (not shown).

On the other hand, a 24.576-MHz clock signal is supplied to a cycle timer 23 made of a register and an 8-kHz reference signal (signal on which the reference time is based) is also supplied from the cycle master node to the cycle timer 23. All nodes set the time based on the reference time.

FIG. 10 shows the configuration of any node other than the cycle master node; in the cycle master node, the reference time is generated by the clock of the home device and thus the 8-kHz reference signal is not supplied to the cycle master node.

The cycle timer 23 counts the clock signal from the value indicated by the reference signal and supplies the count to a latch circuit 24 as a time value. A time stamp timing signal fs/SYT INTERVAL is supplied to the latch circuit 24 periodically. It is a signal generated by means (not shown) and indicating the timing for adding a time stamp, namely, time information to sample data (data block) and is a frequency found by sampling frequency fs/sample interval SYT INTERVAL.

The sample interval SYT INTERVAL is a sample interval at which a time stamp (SYT) is added to the sample data; for example, it is 8. Therefore, the latch circuit 24 retains the time value of the cycle timer 23 when the time stamp timing signal fs/SYT INTERVAL is supplied. Transfer delay time $T_D$ described later is added to the retained time value and the result is supplied to the MUX 22 and is added to sample data at the sample interval SYT INTERVAL at conversion to a packet. Thus, the sample data having the time value every sample interval SYT INTERVAL is sent to the bus 15 as a data packet. An adder for adding the transfer delay time $T_D$ to output of the latch circuit 24 is provided although it is not shown.

Figure 11:
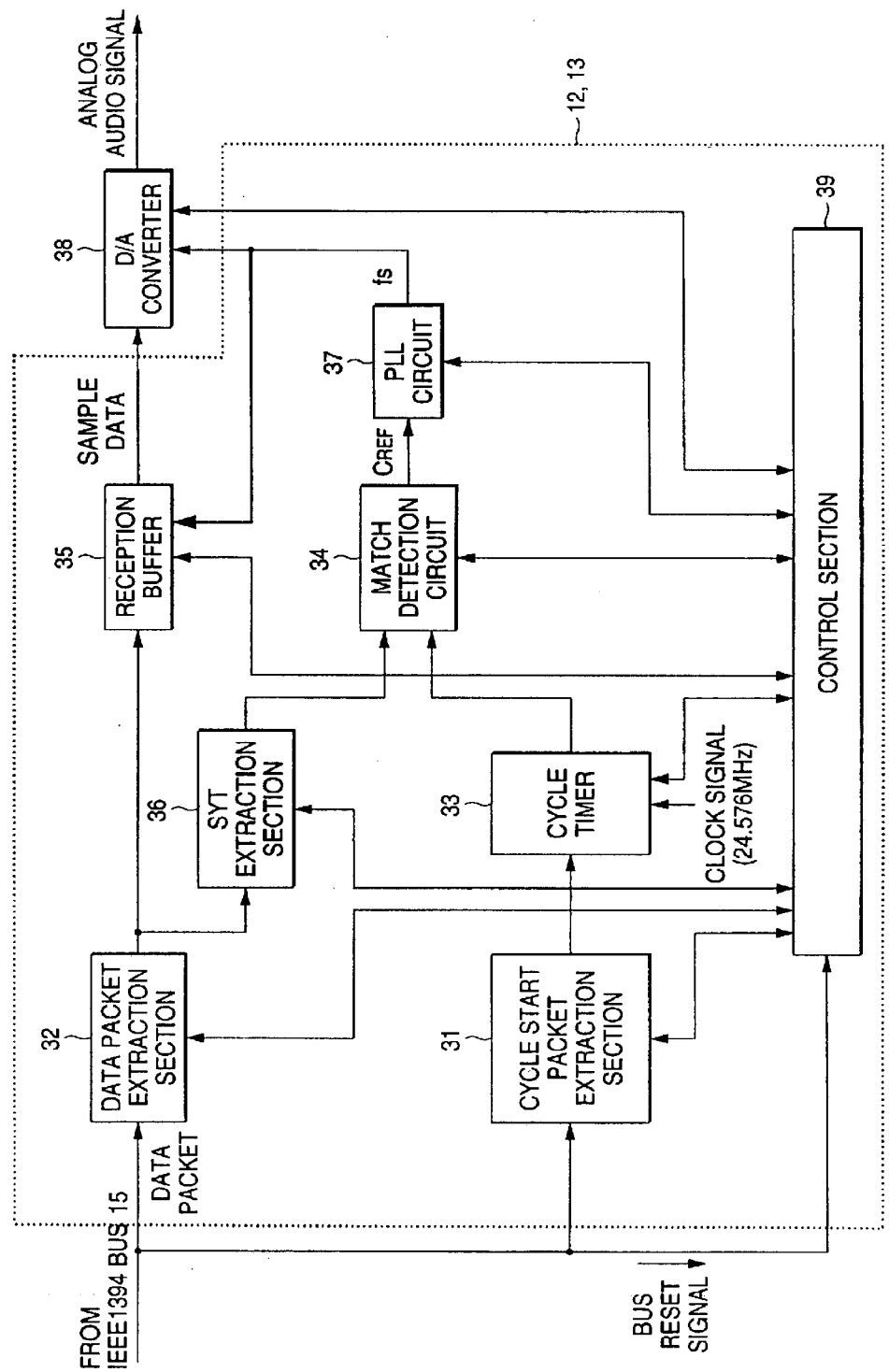
FIG. 11 is a block diagram to show the configuration of the receiver.

In the receiver 12 (13), as shown in FIG. 11, a data packet from the bus 15 is supplied to a cycle start packet extraction section 31 and a data packet extraction section 32 for an isochronous packet. From the data packet transferred via the bus 15, the cycle start packet extraction section 31 extracts a cycle start packet CS and the data packet extraction section 32 extracts an isochronous packet. The extracted cycle start packet CS is supplied to a cycle timer 33 and the time value indicated in the cycle start packet CS is set in the cycle timer 33, which then counts the 24.576-MHz clock signal from the setup time value and outputs the count to a match detection circuit 34 as cycle time (reference time) Tc.

On the other hand, the isochronous packet extracted by the data packet extraction section 32 is stored in a reception buffer 35 and the SYT contained in the CIP header in the isochronous packet is extracted by an SYT extraction section 36 and is output to the match detection circuit 34, which then compares the cycle time Tc output from the cycle timer 33 with the SYT output from the SYT extraction section 36. When the time values match, the match detection circuit 34 outputs a reproduction reference clock signal $C_{REF}$. A PLL circuit 37 generates a reproduction sampling clock signal fs in phase synchronization with the reproduction reference clock signal $C_{REF}$ and transmits the reproduction sampling clock signal fs to the reception buffer 35 and a D/A converter 38. The reception buffer 35 separates sample data in the stored data packet in sample data units in synchronization with the reproduction sampling clock signal fs and outputs. The D/A converter 38 converts the sample data output from the reception buffer 35 into an analog audio signal in synchronization with the reproduction sampling clock signal fs.

A control section 39 for controlling the circuits is provided.

A bus reset signal transmitted on the bus is received at the control section 39.

The data packet transfer method will be furthermore discussed. In the transmitter 11, a time stamp timing signal fs/SYT INTERVAL is generated like a signal waveform shown in FIG. 12A. The time values T1, T2, T3, ... on the rising edges of the time stamp timing signal fs/SYT INTERVAL correspond to sample data with DBC=i, i+8, i+16, ... at the point in time. That is, the sample data string is put into a packet in five or six sample units every 125 μsec and transfer delay time $T_D$ added to the time value T1, T2, T3, ... of the sample data positioned on the rising edge of the time stamp timing signal fs/SYT INTERVAL in the sample data string (for example, T1', T2', T3') is added to the CIP header as SYT. The sample data interval at which the time value is added becomes the sample interval SYT INTERVAL (8 in the example in FIGS. 12A–12E).

Figure 12:
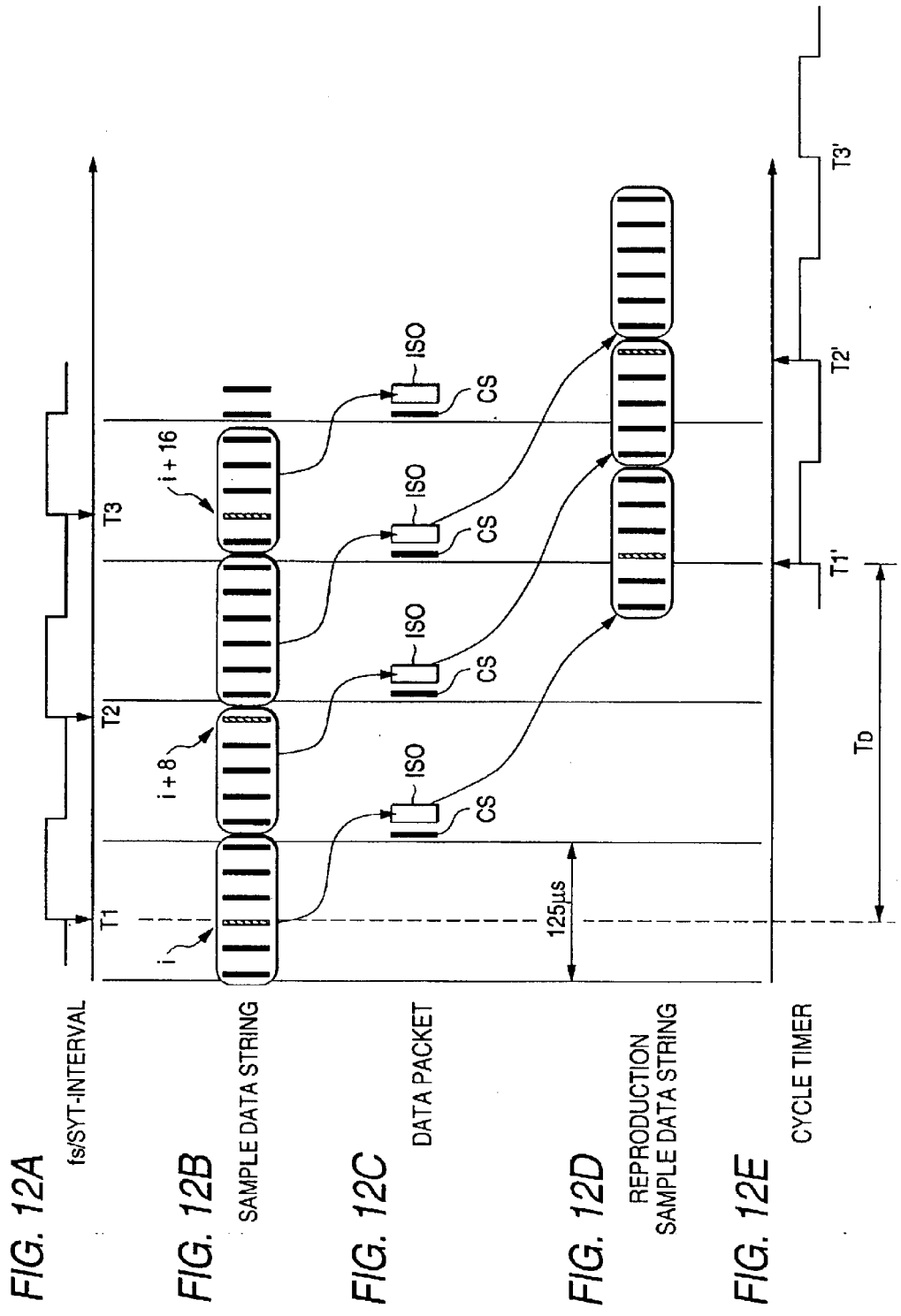
FIGS. 12A to 12E are drawings to describe data packet transfer.

The time value T1', T2', T3' is data indicating the reproduction output time in the receiving party of the corresponding sample data and the transfer delay time $T_D$ is added to the current time value of the cycle timer of the transmitter as described above. In the next cycle to the 125-μsec cycle in which conversion to a packet is executed, the data packet is sent onto the bus as an isochronous packet ISO following a cycle start packet CS, as shown in FIG. 12C.

In the receiver 12, the isochronous packet ISO sent from the transmitter 11 is extracted, then stored in the reception buffer 35. For example, when the time value of the cycle timer of the receiver 12 becomes T1' as shown in FIG. 12E, the sample data with DBC=i is output from the reception buffer 35, as shown in FIG. 12D, in synchronization with the reproduction sampling clock signal fs, and the subsequent sample data is output from the reception buffer 35 in order in synchronization with the reproduction sampling clock signal fs.

When the time value of the cycle timer 33 of the receiver 12 becomes T2', the sample data with DBC=i+8 is output from the reception buffer 35 in synchronization with the reproduction sampling clock signal fs. Such operation is repeated as long as the reproduction reference clock signal $C_{REF}$ is provided, so that data transfer is enabled.

Thus, in the receiving party, the transferred data is stored in the buffer and when the SYT (reproduction specification time data) of the reception data matches the cycle time Tc output from the cycle timer in the receiving party, the data is processed.

However, for example, if a new device is connected to the bus on which isochronous transfer is executed, bus reset occurs as described above, and at the time, there is a possibility that the new connected device on the bus will become the cycle master. At this time, the data stored in the buffer before the bus reset and that after the bus reset differ in time information reference time. Thus, if the SYT (time data) of the data stored before the bus reset does not match the cycle time of the home device in the receiving party for an extended time period, there is a possibility that the buffer will overflow, making it impossible to perform normal reception data processing.

Figure 13:
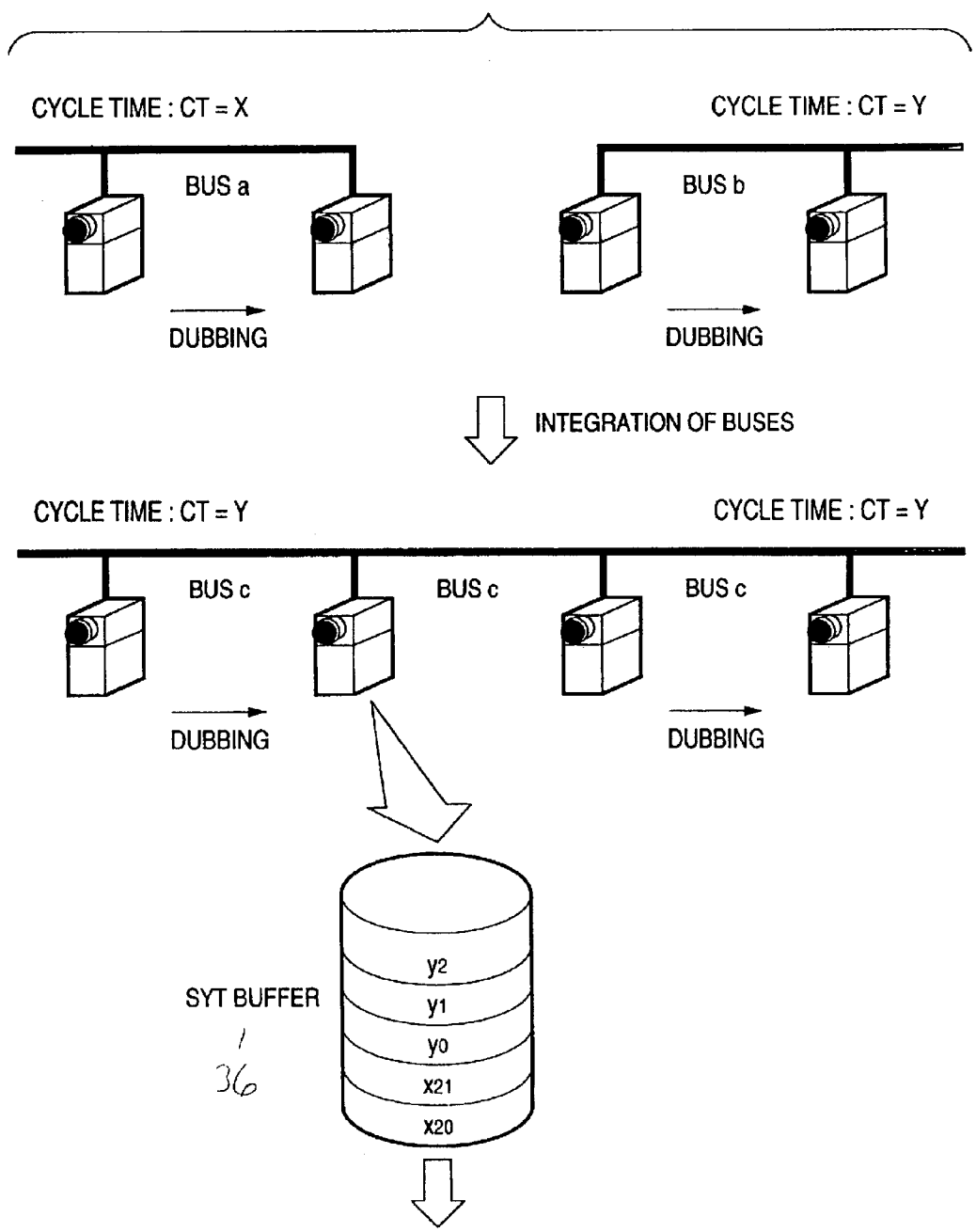
FIG. 13 is a drawing to describe a problem involved in the invention.

Specifically, as shown in FIG. 13, a bus (a) connecting at least two nodes executing transmission and reception at cycle time CT=X and a bus (b) connecting at least two nodes executing transmission and reception at cycle time CT=Y are connected and the cycle time on the resultant bus (c) becomes CT=Y.

At this time, SYT at cycle time CT=X (x20, x21) and SYT at cycle time CT=Y (y0, y1, y2) are mixed in the buffer in the SYT extraction section 36 of the receiving node operating at CT=X.

For example, if SYT (x20, x21) is earlier data than at CT=Y, the cycle time reference time after the bus reset, the SYT (reproduction specification time data) of the data does not match the cycle time Tc (reference time) in the receiving party and the buffer overflows, making it impossible to perform normal reception data processing.

At the time, it is possible to take any of the following five recovery means in the receiving party:

(1) After the bus reset, the reception data and the SYT of the data stored in the buffer in the receiving party before the bus reset are all deleted, and data after the bus reset is processed as usual;

(2) after the bus reset, data transmission to the buffer is interrupted until the data stored in the buffer in the receiving party before the bus reset is processed, and after the data stored before the bus reset has been processed, processing of the data having SYT information after the bus reset is started;

(3) after the bus reset, only SYTs stored in the buffer in the receiving party are all deleted, the data stored just before the bus reset is processed according to the reproduction sampling clock fs generated based on the reproduction reference clock signal generated before the bus reset, and data after the bus reset is processed as usual;

(4) after the bus reset, the data stored before the bus reset is processed using dummy SYT or a dummy reproduction reference clock signal and after the data stored before the bus reset has been all processed, usual processing is performed using SYT or a reproduction reference clock signal after the bus reset; or (5) after the bus reset, the data stored before the bus reset is processed using the cycle time before the bus reset and after the data stored before the bus reset has been all processed, usual processing is performed using cycle time after the bus reset.

Specific methods of (1) to (5) described above will be discussed with reference to the accompanying drawings as first to fifth embodiments:

(First Embodiment)

FIGS. 14A and 14B are drawings to schematically show the method of (1) described above.

FIG. 14A shows the state of a buffer in an SYT extraction section 36 just after bus reset in a receiving party operating at cycle time CT=X and FIG. 14B shows the buffer state after the method (1) is executed.

That is, since transmission and reception are executed at cycle time CT=X before bus reset, SYTs of x20 and x21 are stored in the buffer in the SYT extraction section 36 (FIG. 14A).

After this, when bus reset occurs and the cycle time on the bus becomes CT=Y, all SYTs stored in the buffer in the SYT extraction section 36 are deleted. The data in a reception buffer 35 in the packet containing the SYT is also deleted.

After the bus reset, SYTs at cycle time CT=Y are stored in the buffer in the SYT extraction section 36 as y0, y1, y2 . . . (FIG. 14B).

Thus, in the first embodiment, after the bus reset, the reception data stored in the buffer in the receiving party before the bus reset and the SYT of the data are all deleted.

Figure 16:
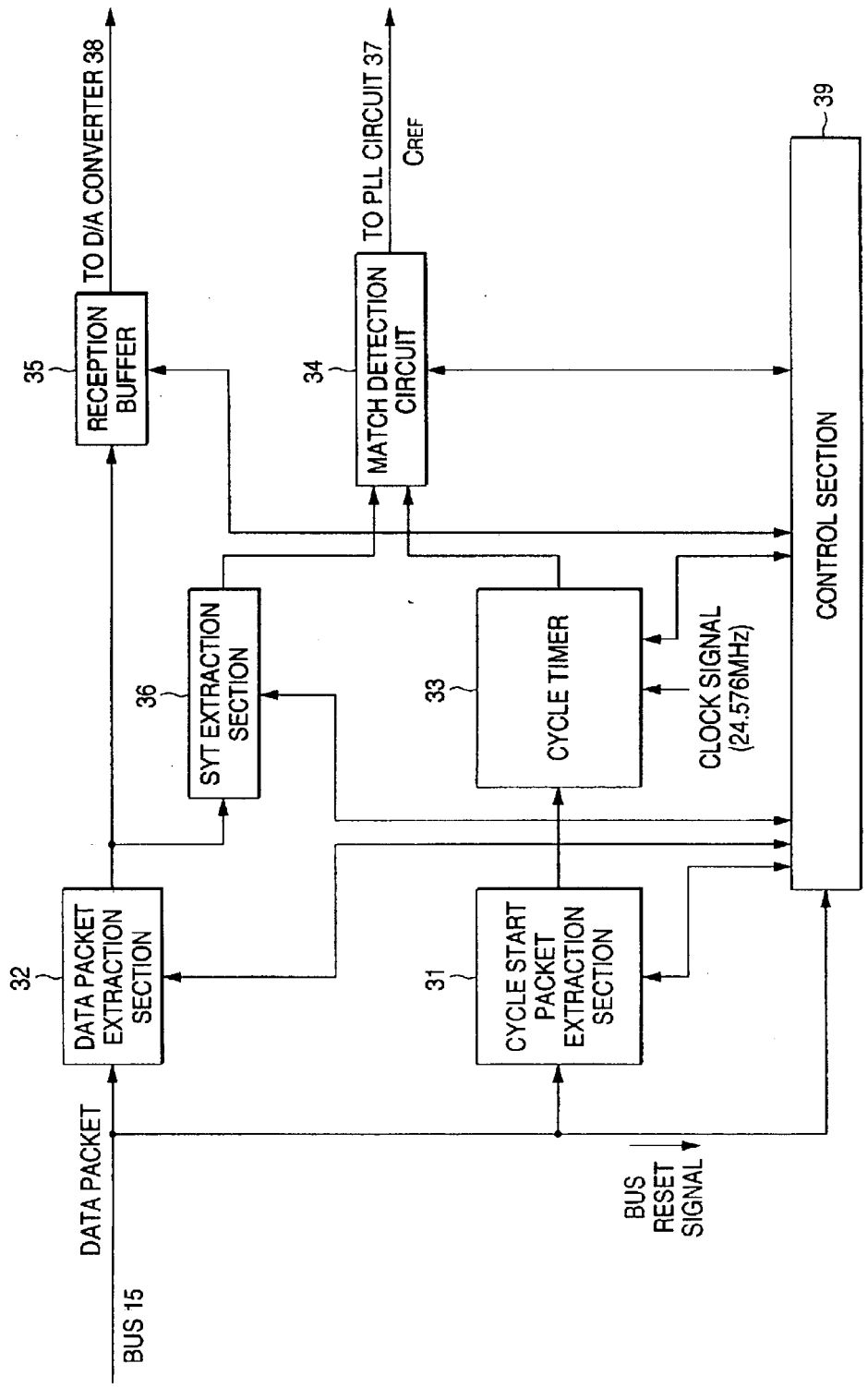
FIG. 16 is a block diagram of the first embodiment of the invention.

FIG. 15 is a flowchart to show the receiver state described above. FIG. 16 is a block diagram provided by extracting the portion related to the first embodiment from the block diagram of FIG. 11. Circuit parts identical with or similar to those previously described with reference to FIG. 11 are denoted by the same reference numerals in FIG. 16 and will not be discussed again.

The specific method of the first embodiment will be discussed with reference to FIGS. 15 and 16.

First, in a state in which data is transmitted and received on a bus 15 by at least two nodes, a cycle start packet extraction section 31 extracts a data packet from the bus 15 and supplies extracted cycle start packet CS to a cycle timer 33, which then sets the time value indicated in the cycle start packet CS in a register (not shown).

On the other hand, a data packet extraction section 32 extracts an isochronous packet on the bus 15 and feeds data in the packet into the reception buffer 35. An SYT extraction section 36 extracts SYT contained in a CIP header in the isochronous packet.

After this, data demodulation processing is performed in predetermined data reception processing previously described with reference to FIG. 11.

If bus reset occurs at step S151 because of connection of a new device or disconnection of an existing device while data is being transferred, a control section 39 receives a bus reset signal. After this, the cycle timer 33 receives a new cycle start packet CS at step S152. The cycle timer 33 receiving the cycle start packet CS is set to the time value indicated in the cycle start packet CS, then counts 24.576-MHz clock signal from the setup time value and outputs the count to a match detection circuit 34 as cycle time (reference time) Tc.

The control section 39 transmits a control signal to the reception buffer 35 and the SYT extraction section 36 so as to clear the data in the buffers.

Upon reception of the control signal, the reception buffer 35 and the SYT extraction section 36 clear all the data in the buffers at step S153.

After step S153, usual operation is repeated until bus reset occurs.

That is, the match detection circuit 34 compares the cycle time Tc supplied from the cycle timer 33 with a new SYT supplied from the SYT extraction section 36. If the time values match, the match detection circuit 34 outputs a reproduction reference clock signal $C_{REF}$. The subsequent steps are executed as described above.

If bus reset does not occur at step S151, usual operation is also repeated until bus reset occurs.

Thus, in the first embodiment, when bus reset occurs, the data in the reception buffer 35 and the buffer in the SYT extraction section 36 are all cleared and processing of data after the bus reset is started as usual. Therefore, even if the time information before the bus reset differs from that after the bus reset, normal processing is performed.

In the first embodiment, the data corresponding to SYT (x20, x21) shown in FIG. 14A is lost, but data demodulation is restarted in the simple configuration.

(Second Embodiment)

Figure 17A:
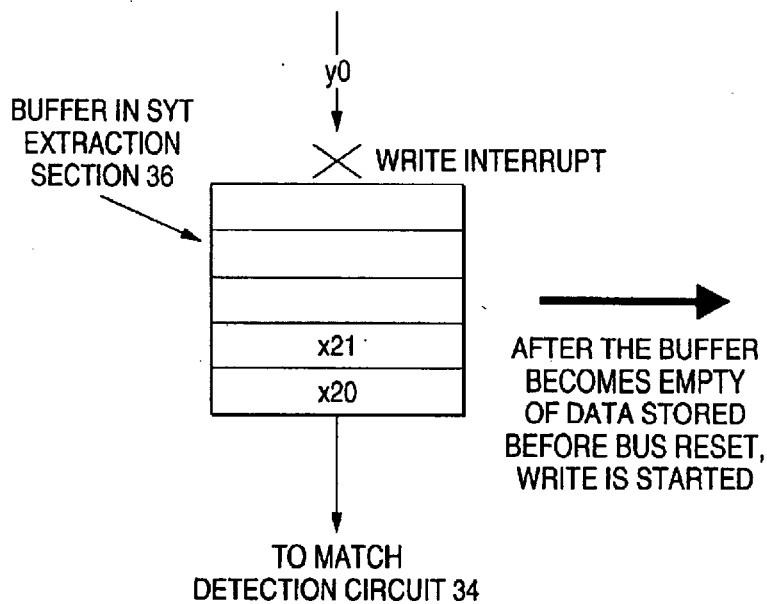
FIGS. 17A and 17B are schematic drawings to show a second embodiment of the invention.
Figure 17B:
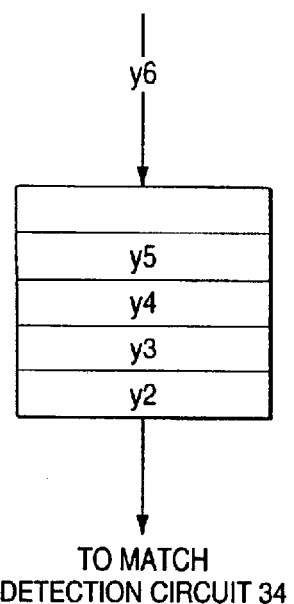

FIGS. 17A and 17B are drawings to schematically show the method of (2) described above.

The buffer state in an SYT extraction section 36 in FIGS. 17A and 17B is the same as that in the first embodiment. FIG. 17A shows the state of a buffer in the SYT extraction section 36 just after bus reset in a receiving party operating at cycle time CT=X and FIG. 17B shows the buffer state after the method (2) is executed.

That is, since transmission and reception are executed at cycle time CT=X before bus reset, SYTs of x20 and x21 are stored in the buffer in the SYT extraction section 36 (FIG. 17A)

After this, when bus reset occurs and the cycle time on the bus becomes CT=Y, the SYT extraction section 36 interrupts input of new SYT. After all the data stored in the SYT extraction section 36 before the bus reset has been processed, the SYT extraction section 36 restarts input of new SYT.

After input of new SYT is restarted, SYTs at cycle time CT=Y are stored in the buffer in the SYT extraction section 36 as y2, y3, y4, y5 . . . (FIG. 17B).

Thus, in the second embodiment, after the bus reset, data feeding into the buffer is interrupted until the data stored in the buffer in the receiving party before the bus reset is processed, and after the data stored before the bus reset has been processed, feeding of the data having SYT information after the bus reset is started.

Figure 18:
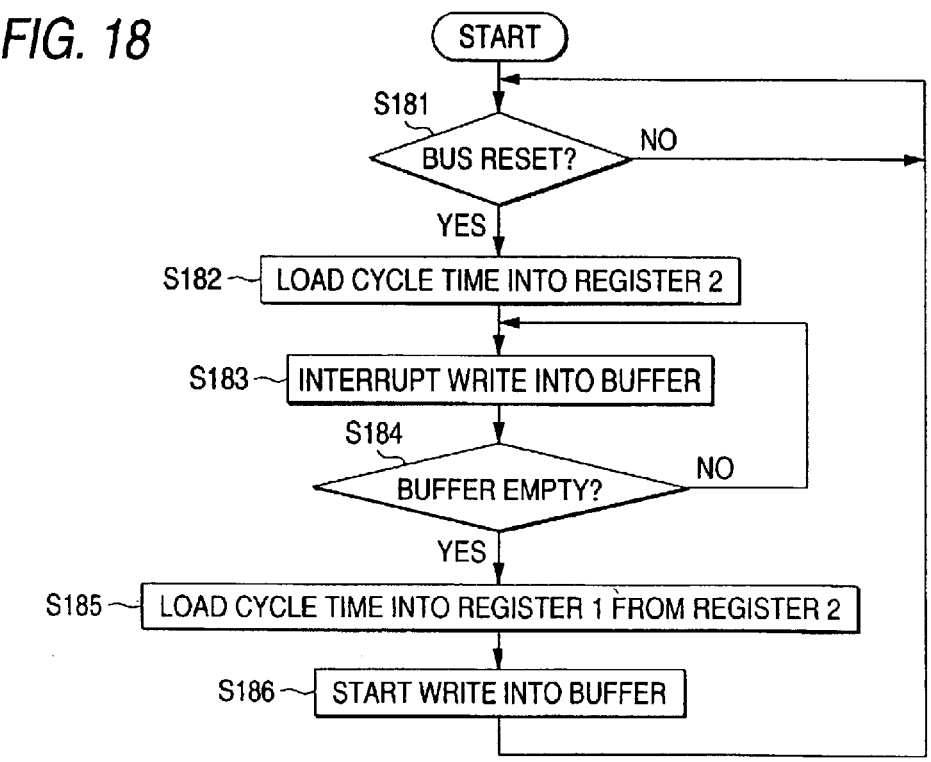
FIG. 18 is a flowchart to show the second embodiment of the invention.
Figure 19:
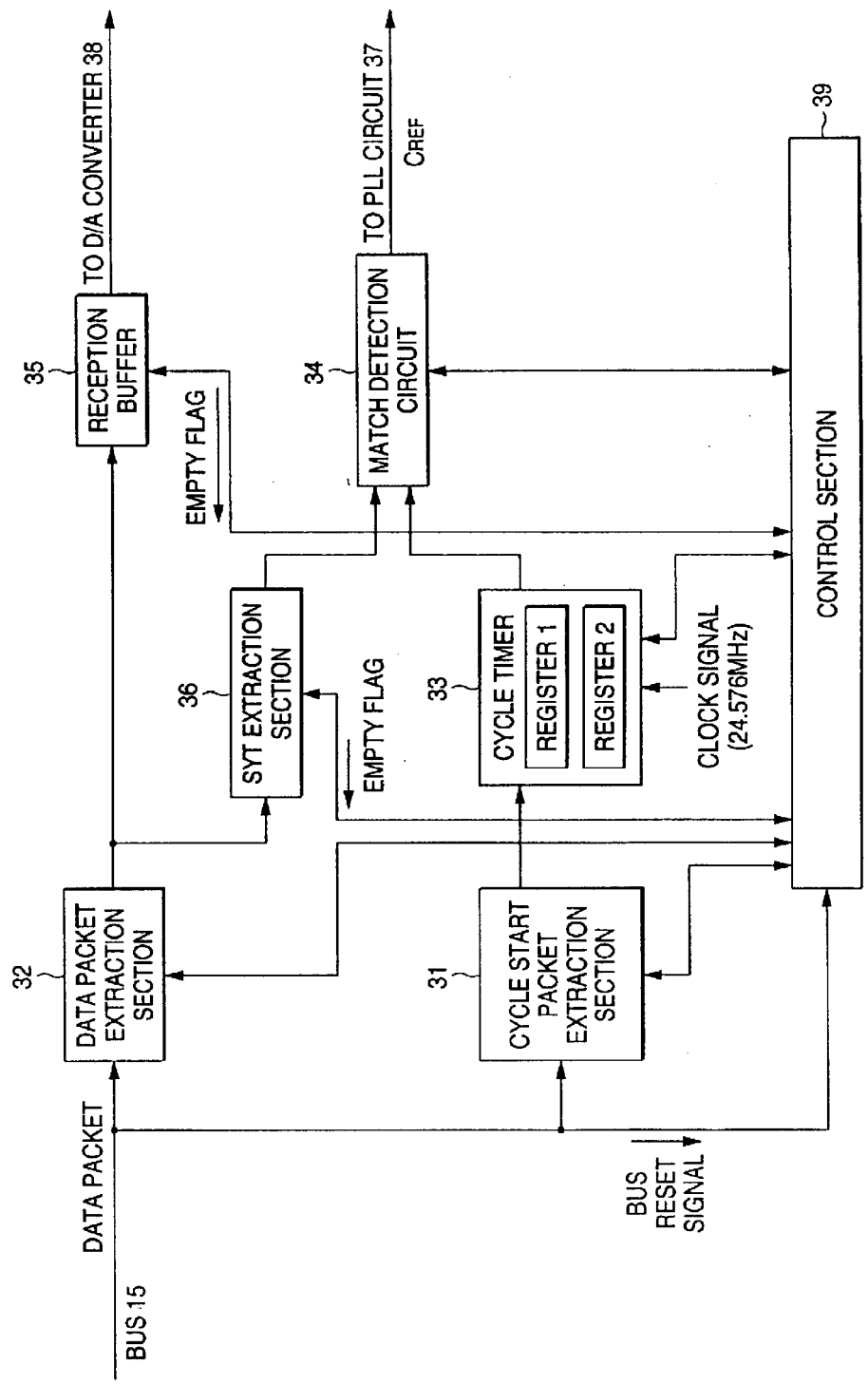
FIG. 19 is a block diagram of the second embodiment of the invention.

FIG. 18 is a flowchart to show the receiver state described above. FIG. 19 is a block diagram provided by extracting the portion related to the second embodiment from the block diagram of FIG. 11. Circuit parts identical with or similar to those previously described with reference to FIG. 11 are denoted by the same reference numerals in FIG. 18 and will not be discussed again.

In the embodiment, a cycle timer 33 has two registers for temporarily retaining data.

The specific method of the second embodiment will be discussed with reference to FIGS. 18 and 19.

First, in a state in which data is transmitted and received on a bus 15 by at least two nodes, a cycle start packet extraction section 31 extracts a data packet from the bus 15 and supplies extracted cycle start packet CS to the cycle timer 33, which then sets the time value indicated in the cycle start packet CS in a register 1, for example.

On the other hand, a data packet extraction section 32 extracts an isochronous packet on the bus 15 and feeds data in the packet into the reception buffer 35. An SYT extraction section 36 extracts SYT contained in a CIP header in the isochronous packet.

After this, data demodulation processing is performed in data reception processing described above.

If bus reset occurs at step S181 because of connection of a new device or disconnection of an existing device while data is being transferred, a control section 39 receives a bus reset signal. After this, the control section 39 sends a control signal to the cycle timer 33 for instructing the cycle timer 33 to store a new cycle time in another register. Upon reception of the control signal, the cycle timer 33 writes a new cycle time into a second register 2, for example, at step S182.

At this time, the cycle timer 33 generates the cycle time of the home device based on the cycle time stored in the register 1 and continues to supply the cycle time to a match detection circuit 34.

On the other hand, the control section 39 transmits a control signal to the reception buffer 35 and the SYT extraction section 36 for instructing the reception buffer 35 and the SYT extraction section 36 to interrupt data write into buffers.

Upon reception of the control signal, the reception buffer 35 and the SYT extraction section 36 interrupt data write into the buffers at step S183.

At this time, processing of the data already stored in the reception buffer 35 before the bus reset is continued.

Then, in the reception buffer 35, whether or not FIFO in the reception buffer 35 becomes empty of data is checked. If the FIFO in the reception buffer 35 does not become empty of data (N at step S184), interrupt of data write into the buffer at step S183 is continued. If the FIFO in the reception buffer 35 becomes empty of data (Y at step S184), the reception buffer 35 returns Empty Flag to the control section 39.

Upon reception of Empty Flag, the control section 39 sends a control signal to the cycle timer 33 for instructing the cycle timer 33 to rewrite cycle time. Upon reception of the control signal, the cycle timer 33 rewrites the cycle time stored in the register 2 into the register 1 at step S185, then generates the cycle time of the home device based on the cycle time and supplies the generated cycle time to the match detection circuit 34.

The control section 39 sends a control signal to the reception buffer 35 and the SYT extraction section 36 for instructing the reception buffer 35 and the SYT extraction section 36 to restart data write into the buffers.

Upon reception of the control signal, the reception buffer 35 and the SYT extraction section 36 restart data write into the buffers at step S186.

After the reception buffer 35 and the SYT extraction section 36 restart data write into the buffers at step S186, usual operation is repeated until bus reset occurs.

If bus reset does not occur at step S181, usual operation is also repeated until bus reset occurs.

At step S183, control can also be performed so as to instruct the data packet extraction section 32 not to extract data after the bus reset or the data packet extraction section 32 not to transmit data.

In short, control may be performed so that data is not stored in the reception buffer 35 or the SYT extraction section 36.

In the second embodiment, the data amount in the reception buffer 35 is checked. However, data in FIFO in the SYT extraction section 36 is monitored and if the FIFO in the SYT extraction section 36 becomes empty of data, Empty Flag can also be transmitted. As described later in a fourth embodiment, at the bus reset time, the FIFO data amount is measured in either or both of the reception buffer 35 or the SYT extraction section 36 and if the data amount output from the FIFO reaches the measurement value, a predetermined control signal can also be output.

In short, a control signal indicating that the FIFO in either or both of the reception buffer 35 and the SYT extraction section 36 becomes empty of data stored before the bus reset may be output.

Thus, in the second embodiment, after bus reset occurs, data write into the reception buffer 35 and the buffer in the SYT extraction section 36 is interrupted and after the data stored before the bus reset has been processed, processing of data after the bus reset is started. Therefore, even if the time information before the bus reset differs from that after the bus reset, normal processing is performed.

Thus, in the second embodiment, the data related to SYT (y0, y1) shown in FIG. 17A is lost, but the data stored before the bus reset is processed normally and usual processing is also restarted after the bus reset.

(Third Embodiment)

Figure 20A:
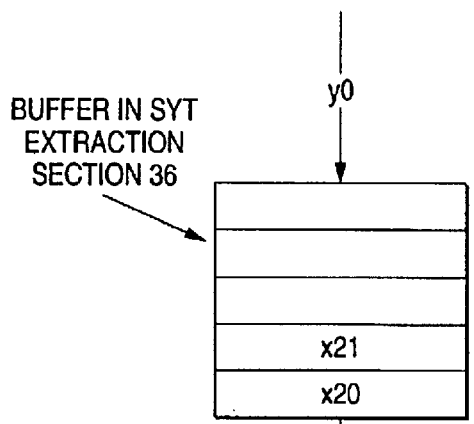
FIGS. 20A and 20B are schematic drawings to show a third embodiment of the invention.
Figure 20B:
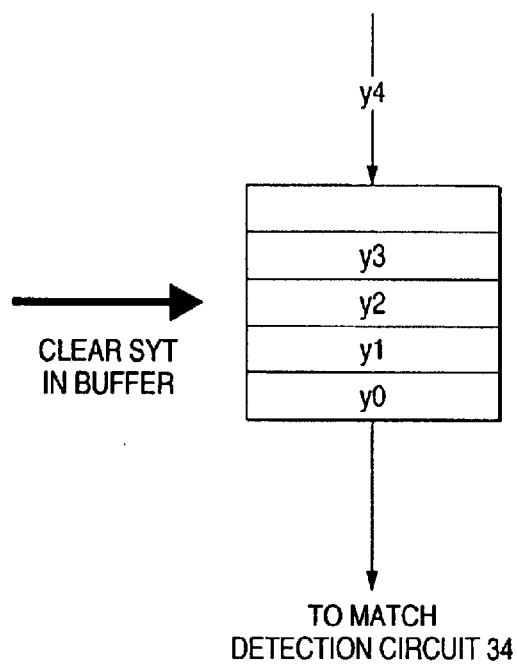

FIGS. 20A and 20B are drawings to schematically show the method of (3) described above.

The buffer state in an SYT extraction section 36 in FIGS. 20A and 20B is the same as that in the first embodiment. FIG. 20A shows the state of a buffer in the SYT extraction section 36 just after bus reset in a receiving party operating at cycle time CT=X and FIG. 20B shows the buffer state after the method (3) is executed.

That is, since transmission and reception are executed at cycle time CT=X before bus reset, SYTs of x20 and x21 are stored in the buffer in the SYT extraction section 36 (FIG. 20A).

After this, when bus reset occurs and the cycle time on the bus becomes CT=Y, all SYTs stored in the buffer in the SYT extraction section 36 are deleted.

Then, the SYT extraction section 36 starts input of new SYT.

After input of new SYTs, SYTs at cycle time CT=Y are stored in the buffer in the SYT extraction section 36 as y0, y1, y2, y3 . . . (FIG. 20B).

After the bus reset, the data stored in the reception buffer 35 before the bus reset is controlled according to a reproduction sampling clock fs generated by a reproduction reference clock signal $C_{REF}$ generated when cycle time CT=X before the bus reset. After all the data related to the cycle time CT=X has been processed, data related to cycle time CT=Y is processed as usual.

Thus, in the third embodiment, after the bus reset, all SYTs stored in the buffer in the SYT extraction section 36 are deleted.

Figure 21:
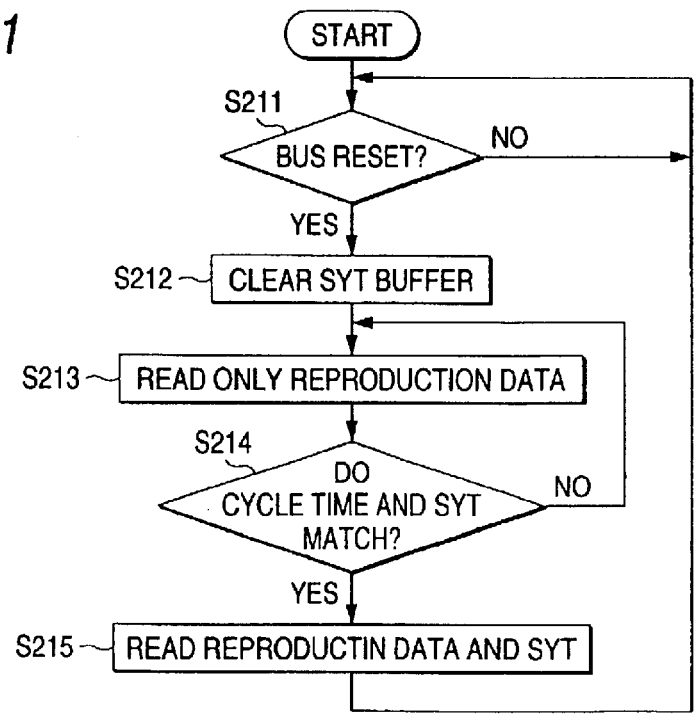
FIG. 21 is a flowchart to show the third embodiment of the invention.

FIG. 21 is a flowchart to show the state described above.

The specific method of the third embodiment will be discussed with reference to FIGS. 16 and 21.

First, in a state in which usual operation is performed as previously described in the first embodiment, if bus reset occurs at step S211 because of connection of a new device or disconnection of an existing device, a control section 39 receives a bus reset signal. After this, the control section 39 sends a control signal to the SYT extraction section 36 so as to clear all SYTs in the buffer.

Upon reception of the control signal, the SYT extraction section 36 clears all the SYTs in the buffer at step S212.

Processing of the data stored in the reception buffer 35 is continued at step S213 in synchronization with a reproduction sampling clock signal fs phase-synchronized with a reference clock $C_{REF}$ generated before the bus reset.

In this state, SYT is not transmitted from the SYT extraction section 36 to a match detection circuit 34 for a while, thus the match detection circuit 34 does not output a reference clock $C_{REF}$. However, a PLL circuit 37 continues to hold the reproduction sampling clock signal fs generated based on the reference clock $C_{REF}$ generated before the bus reset, thus the data stored before the bus reset is processed according to the sampling clock signal fs.

On the other hand, a cycle start packet extraction section 31 extracts a new cycle start packet CS and supplies the cycle start packet CS to a cycle timer 33. The SYT extraction section 36 extracts a new SYT and supplies the SYT to the match detection circuit 34.

The cycle timer 33 counts 24.576 MHz clock signal from the time value indicated in the cycle start packet CS supplied after the bus reset and supplies cycle time Tc to he match detection circuit 34.

The match detection circuit 34 compares the cycle time Tc supplied from the cycle timer 33 with the SYT supplied from the SYT extraction section 36 at step S214. If the time values match, the match detection circuit 34 generates a reproduction reference clock signal $C_{REF}$.

If the cycle time Ct and the SYT do not match at step S214, control goes to step S213 at which processing of the data stored in the reception buffer 35 is continued in synchronization with the reproduction sampling clock signal fs phase-synchronized with the reference clock $C_{REF}$ generated before the bus reset. On the other hand, if the cycle time Ct and the SYT match, the data stored in the reception buffer 35 is processed at step S215 in synchronization with the reproduction sampling clock signal fs phase-synchronized with the reproduction reference clock signal $C_{REF}$ when the time values match.

After usual reproduction processing is restarted at step S215, whether or not bus reset occurs is checked.

If bus reset does not occur at step S211, the usual operation is repeated until bus reset occurs.

Thus, in the third embodiment, all the data in the buffer in the SYT extraction section 36 is cleared, the data stored just before the bus reset is processed according to the reproduction sampling clock signal fs generated before the bus reset, and the data after the bus reset is processed as usual. Therefore, even if the time information before the bus reset differs from that after the bus reset, normal processing is performed.

In the third embodiment, the data stored before the bus reset and that stored after the bus reset are processed normally without losing the data before and after the bus reset.

(Fourth Embodiment)

A fourth embodiment of the invention corresponds to the method of (4) described above. After bus reset occurs, the data stored before the bus reset is processed using dummy SYT or a dummy reference clock and after all the data stored before the bus reset has been processed, usual processing is performed using SYT or a reference clock after the bus reset.

The embodiment provides two methods, which will be discussed in detail as first and second methods of the fourth embodiment.

(First Method of Fourth Embodiment)

The first method of the fourth embodiment is a method of generating dummy SYT.

Figure 22:
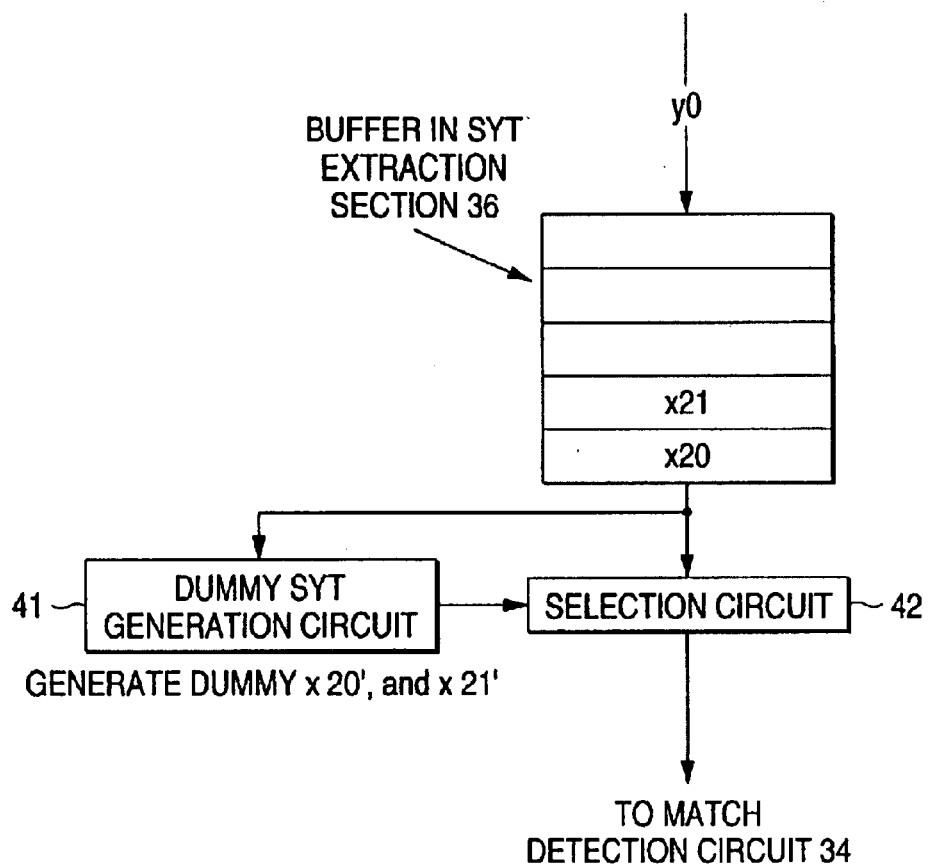
FIG. 22 is a schematic drawing to show a first method of a fourth embodiment of the invention.

FIG. 22 is a drawing to schematically show the first method of the fourth embodiment.

That is, before bus reset occurs, transmission and reception are executed at cycle time CT=X, thus SYTs of x20 and x21 are stored in a buffer in an SYT extraction section 36.

After this, when bus reset occurs and the cycle time on a bus becomes CT=Y, the SYT extraction section 36 inputs new SYT.

After input of new SYTs, SYTs at cycle time CT=Y are stored in the buffer in the SYT extraction section 36 as y0, y1, y2, y3 . . .

On the other hand, a dummy SYT generation circuit 41 generates x20' and x21' of dummy SYTs corresponding to SYTs of x20 and x21 after the bus reset occurs, and supplies x20' and x21' to a selection circuit 42, which then changes SYT from SYTs of the SYT extraction section 36 to the dummy SYTs of the dummy SYT generation circuit 41 in response to the bus reset signal, and supplies the dummy SYTs to a match detection circuit 34.

Upon completion of output of the dummy SYTs, again normal SYTs are supplied to the match detection circuit 34.

Thus, in the first method of the fourth embodiment, after the bus reset, the data stored before the bus reset is processed using dummy SYT and after all the data stored before the bus reset has been processed, usual processing is performed using SYT after the bus reset.

Figure 23:
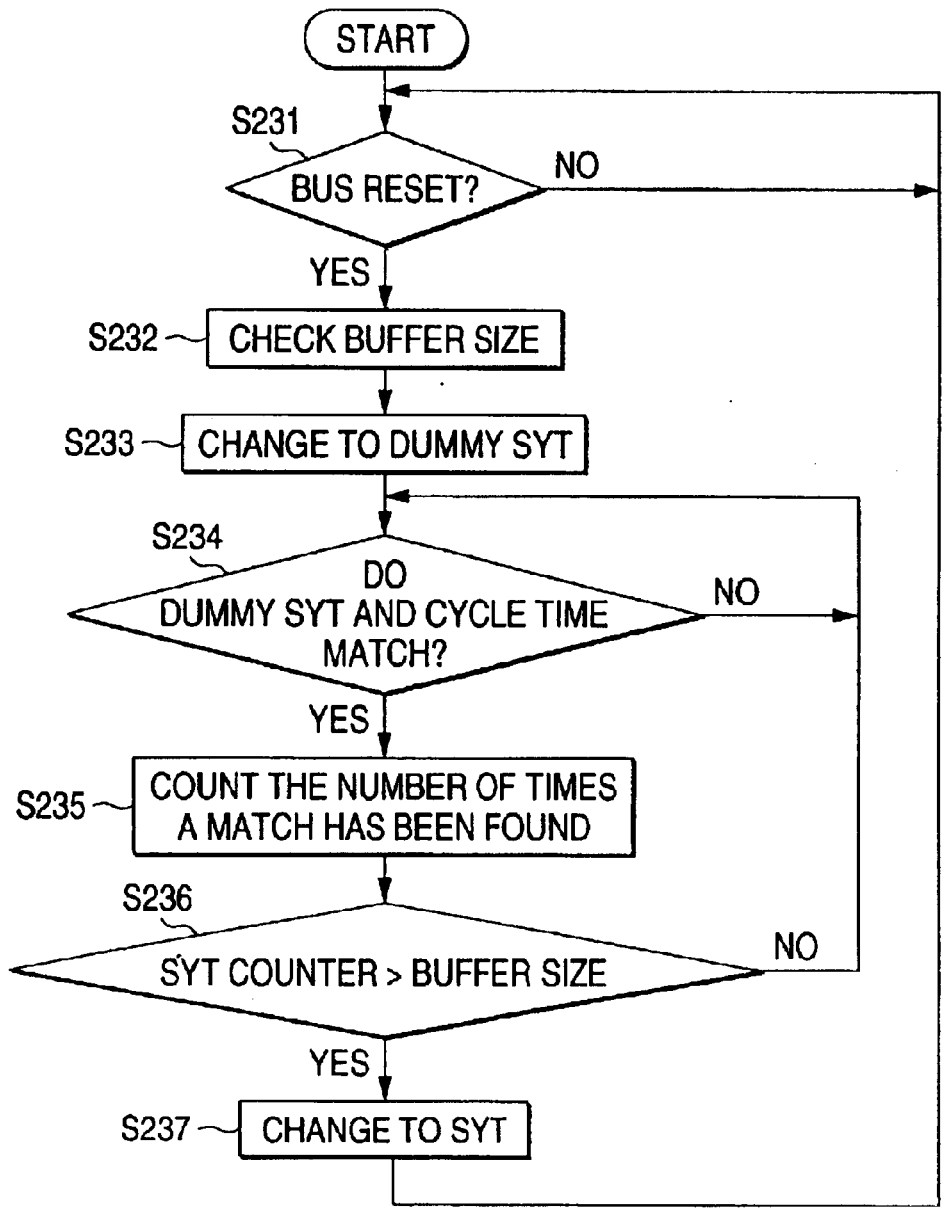
FIG. 23 is a flowchart to show the first method of the fourth embodiment of the invention.
Figure 24:
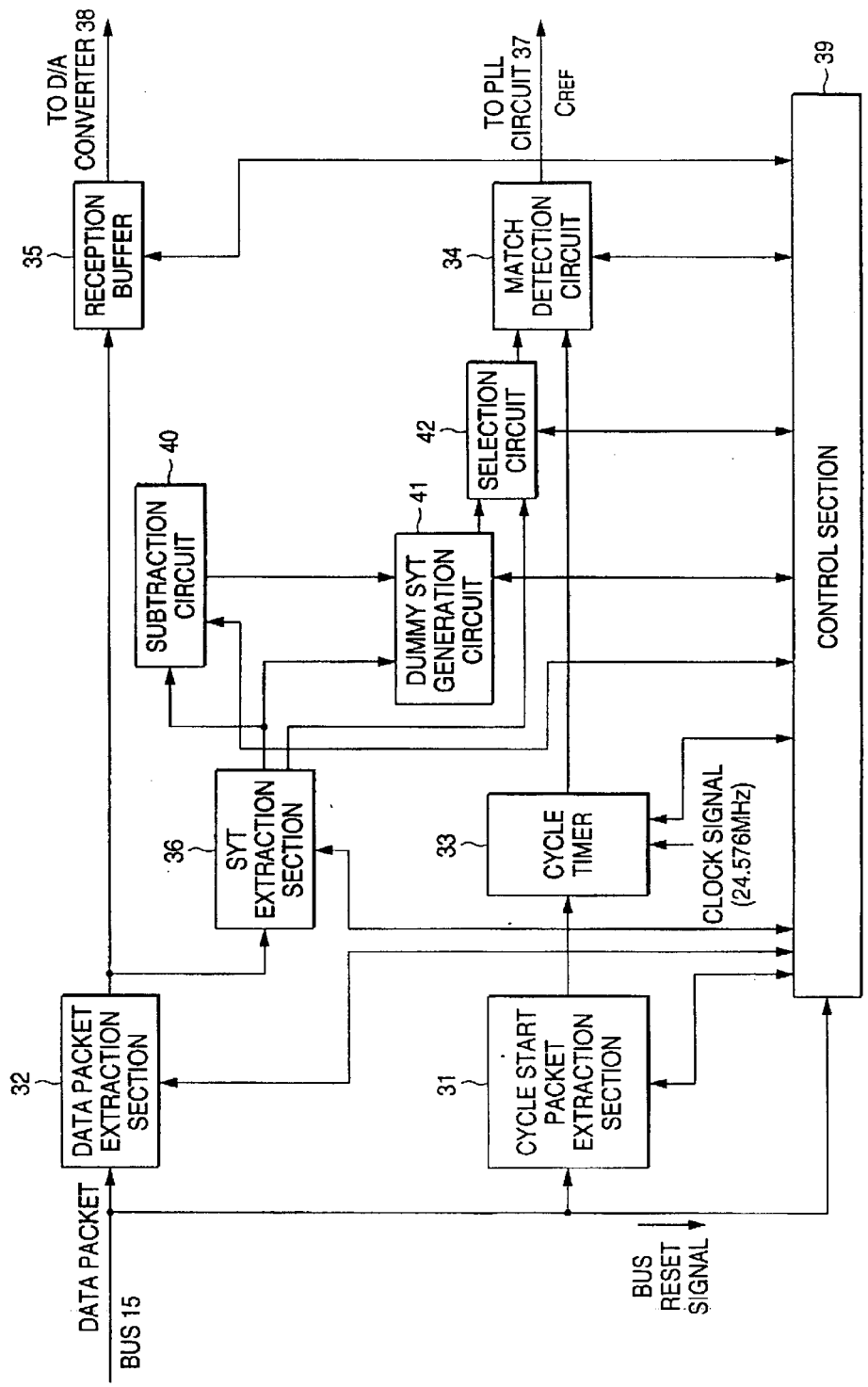
FIG. 24 is a block diagram to show the first method of the fourth embodiment of the invention.

FIG. 23 is a flowchart to show the receiver state described above. FIG. 24 is a block diagram provided by extracting the portion related to the fourth embodiment from the block diagram of FIG. 11. Circuit parts identical with or similar to those previously described with reference to FIG. 11 are denoted by the same reference numerals in FIG. 24 and will not be discussed again.

The fourth embodiment further includes a subtraction circuit 40, the dummy SYT generation circuit 41, and the selection circuit 42.

The subtraction circuit 40 receives SYTs from an SYT extraction section 36, calculates a difference between the preceding and following SYTs according to a calculation expression described later, and supplies the difference to the dummy SYT generation circuit 41 as the time difference (D).

The dummy SYT generation circuit 41 receives the time difference (D) and receives SYT from the SYT extraction section 36. It uses the time difference (D) and the SYT from the SYT extraction section 36 to generate a dummy SYT according to a calculation expression described later and supplies the dummy SYT to the selection circuit 42.

The selection circuit 42 selectively supplies the SYT from the SYT extraction section 36 or the dummy SYT from the dummy SYT generation circuit 41 to the match detection circuit 34.

The first method of the fourth embodiment will be discussed specifically with reference to FIGS. 23 and 24.

First, in a state in which usual operation is performed as previously described in the first embodiment, if bus reset occurs at step S231 because of connection of a new device or disconnection of an existing device, a control section 39 receives a bus reset signal. After this, the control section 39 sends a control signal to the SYT extraction section 36 so as to check Buffer Size in the buffer.

Upon reception of the control signal, the SYT extraction section 36 checks Buffer Size in the buffer and returns the Buffer Size to the control section 39 at step S232.

The Buffer Size is a value of counting the number of SYTs stored in the buffer in the SYT extraction section 36 when bus reset occurs. For example, if two SYTs (x20 and x21) are stored before bus reset as shown in FIG. 22, Buffer Size is set to 2.

The control section 39 also sends a change signal to the selection circuit 42.

Upon reception of the change signal, the selection circuit 42 changes the SYT to be supplied to the match detection circuit 34 to the dummy SYT supplied from the dummy SYT generation circuit 41 at step S233.

The control section 39 counts, at step S235, the number of times the match detection circuit 34 has found a match between the SYT from the selection circuit 42 and the cycle time from a cycle timer 33 after the bus reset at step S234. If the count exceeds the Buffer Size at step S236, the control section 39 sends again a change signal to the selection circuit 42.

This means that the change signal is transmitted if count>2, for example, in FIG. 22.

Upon reception of the change signal, the selection circuit 42 changes the SYT to be transmitted to the match detection circuit 34 to normal SYT at step S237.

On the other hand, if the count is not greater than the Buffer Size at step S236, control goes to step S234 and steps S234 to S236 are repeated.

After usual reproduction processing is restarted at step S237, whether or not bus reset occurs is checked.

If bus reset does not occur at step S231, the usual operation is repeated until bus reset occurs.

Thus, in the first method of the fourth embodiment, dummy SYT is generated after the bus reset. Therefore, even if the time information before the bus reset differs from that after the bus reset, normal processing is performed.

The specific generation method of a dummy SYT is as follows:

In FIG. 24, SYT is always supplied to the subtraction circuit 40 and when bus reset occurs, the subtraction circuit 40 calculates the time difference between the SYT just before the bus reset (SYT at cycle time CT=X) and the SYT just after the bus reset (SYT at cycle time CT=Y) as the following expression (1), and supplies the time difference (D) to the dummy SYT generation circuit 41.

Time difference $(D)=(SYT$ just before bus reset$)-(SYT$ just after bus reset$)$ (1)

The dummy SYT generation circuit 41 adds the time difference to the SYT at cycle time CT=X before the bus reset as the following expression (2), and supplies the dummy SYT to the selection circuit 42.

dummy $SYT=(SYT$ before bus reset$)+$time difference $(D)$ (2)

Specifically, if bus reset occurs, for example, in a state in which SYTs at cycle time CT=X (x20 and x21) are stored in the buffer in the SYT extraction section 36 as shown in FIG. 22, the SYT extraction section 36 extracts SYT at CT=Y (y0), the next cycle time.

At this time, the subtraction circuit 40 subtracts x21 from y0 to find the time difference (D) and supplies the time difference (D) to the dummy SYT generation circuit 41.

The dummy SYT generation circuit 41 adds the time difference (D) to the SYTs at cycle time CT=X (x20 and x21) transmitted from the SYT extraction section 36 to generate dummy SYTs (x20' and x21') and supplies the dummy SYTs to the selection circuit 42.

The dummy SYTs are thus generated.

In the first method of the fourth embodiment, the selection circuit 42 changes SYT to be supplied to the match detection circuit 34 based on Buffer Size in the buffer in the SYT extraction section 36, but it can also change SYT based on Buffer Size in a reception buffer 35. How to find the Buffer Size is not limited to that in the fourth embodiment; any other method may be adopted if the data amount in the buffer can be found. The SYT extraction section 36 determines whether each SYT is an SYT stored before or after bus reset as described later in a fifth embodiment of the invention, and the selection circuit 42 can also change SYT to be supplied to the match detection circuit 34 based on the determination result.

The time difference (D) can also be transmitted to the cycle timer 33 to generate a dummy cycle time. At the time, the time difference (D) may be subtracted from the cycle time after bus reset.

(Second Method of Fourth Embodiment)

Next, the second method of the fourth embodiment is a method of generating a dummy reproduction reference clock signal $C_{REF}'$.

Figure 25:
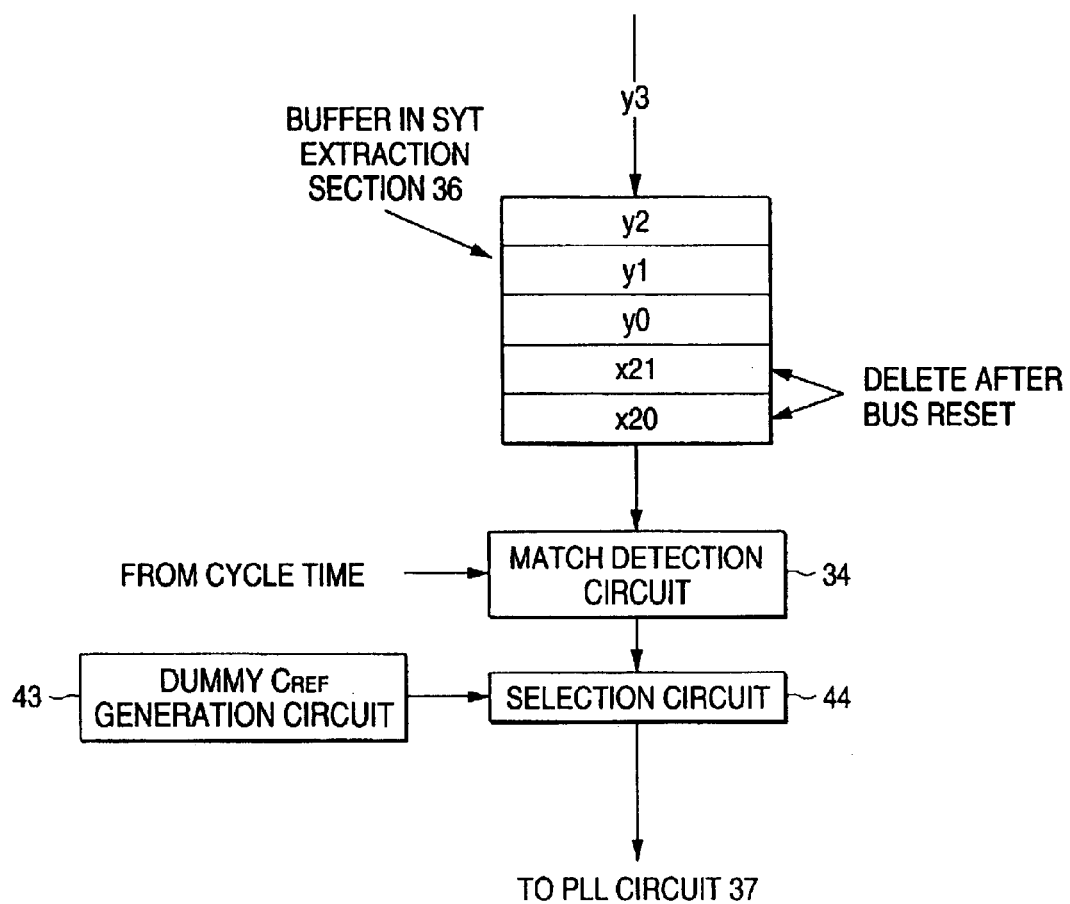
FIG. 25 is a schematic drawing to show a second method of the fourth embodiment of the invention.

FIG. 25 is a drawing to schematically show the second method of the fourth embodiment.

That is, before bus reset occurs, transmission and reception are executed at cycle time CT=X, thus SYTs of x20 and x21 are stored in the buffer in the SYT extraction section 36.

After this, when bus reset occurs and the cycle time on the bus becomes CT=Y, the SYT extraction section 36 inputs new SYT.

After input of new SYTs, SYTs at cycle time CT=Y are stored in the buffer in the SYT extraction section 36 as y0, y1, y2 y3 . . .

On the other hand, a dummy reproduction reference clock signal $C_{REF}'$ generation circuit 43 generates dummy reproduction reference clock signal $C_{REF}'$ corresponding to SYTs of x20 and x21 after the bus reset occurs, and sends the dummy reproduction reference clock signal $C_{REF}'$ to a selection circuit 44, which then changes the clock signal from reproduction reference clock signal $C_{REF}$ from the match detection circuit 34 to the dummy reproduction reference clock signal $C_{REF}'$ from the dummy reproduction reference clock signal $C_{REF}'$ generation circuit 43 in response to the bus reset signal, and supplies the dummy reproduction reference clock signal $C_{REF}'$ to a PLL circuit 37.

After completion of processing of the data stored before the bus reset, again the reproduction reference clock signal $C_{REF}$ from the match detection circuit 34 is output to the PLL circuit 37.

The SYTs stored before the bus reset are deleted as described later.

Thus, in the second method of the fourth embodiment, after the bus reset, the data stored before the bus reset is processed using dummy reference clock and after all the data stored before the bus reset has been processed, processing is performed using reference clock after the bus reset.

Figure 26:
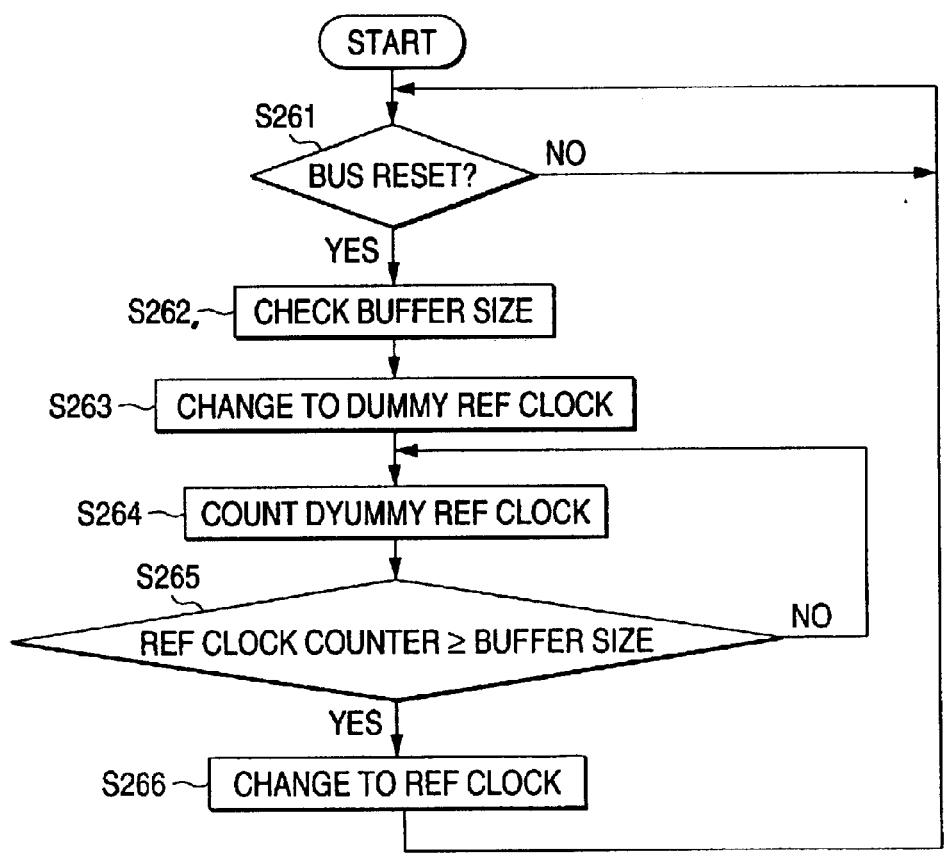
FIG. 26 is a flowchart to show the second method of the fourth embodiment of the invention.
Figure 27:
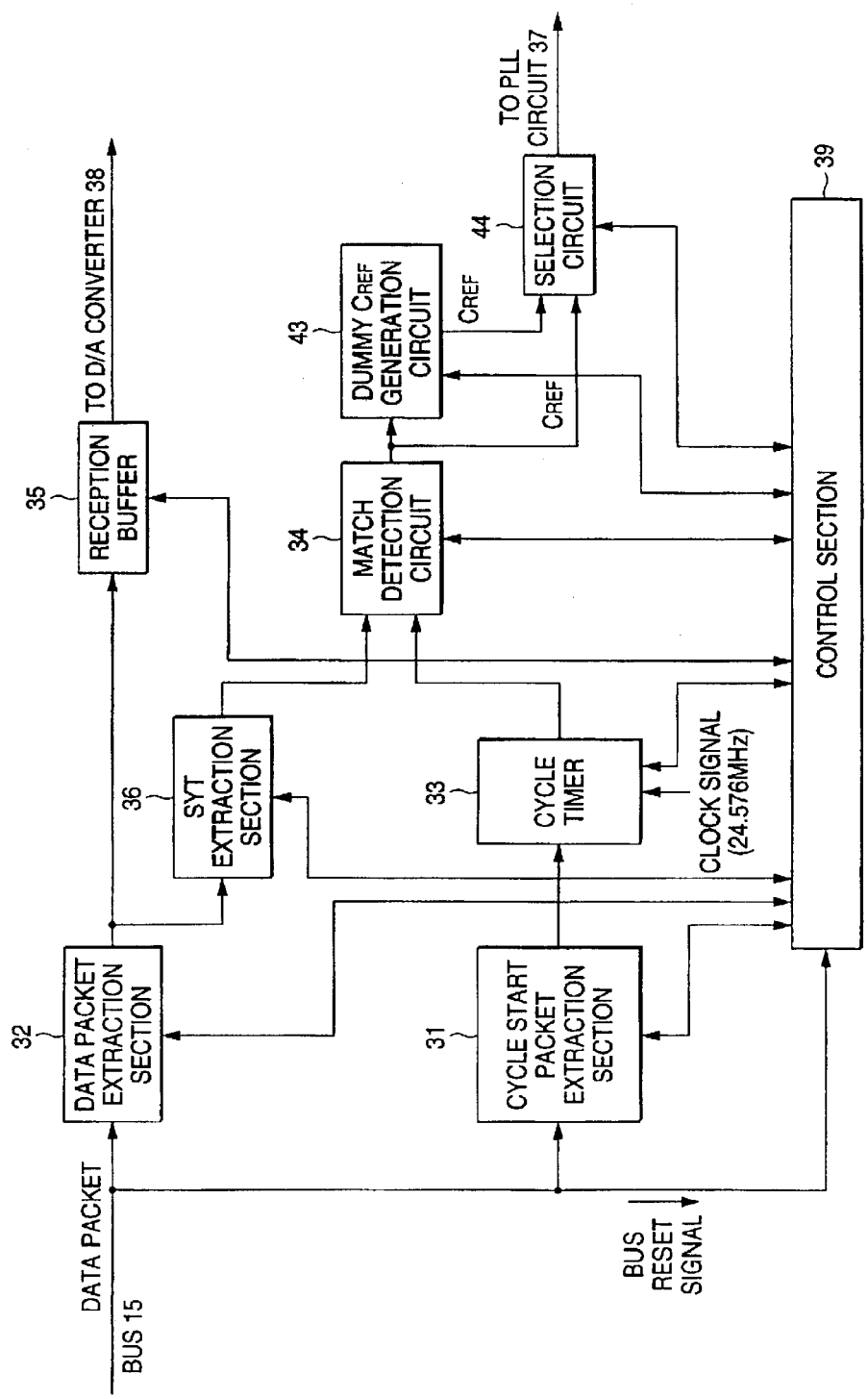
FIG. 27 is a block diagram to show the second method of the fourth embodiment of the invention.

FIG. 26 is a flowchart to show the receiver state described above. FIG. 27 is a block diagram provided by extracting the portion related to the fourth embodiment from the block diagram of FIG. 11. Circuit parts identical with or similar to those previously described with reference to FIG. 11 are denoted by the same reference numerals in FIG. 27 and will not be discussed again.

The fourth embodiment further includes the dummy reproduction reference clock signal $C_{REF}'$ generation circuit 43 and the selection circuit 44.

The dummy reproduction reference clock signal $C_{REF}'$ generation circuit 43 receives a reproduction reference clock signal $C_{REF}$ from the match detection circuit 34, generates a dummy reproduction reference clock signal $C_{REF}'$ by a method described later from the reproduction reference clock signal $C_{REF}$, and supplies the dummy reproduction reference clock signal $C_{REF}'$ to the selection circuit 44.

The selection circuit 44 selectively supplies the reproduction reference clock signal $C_{REF}$ from the match detection circuit 34 or the dummy reproduction reference clock signal $C_{REF}'$ from the dummy reproduction reference clock signal $C_{REF}'$ generation circuit 43 to the PLL circuit 37.

The second method of the fourth embodiment will be discussed specifically with reference to FIGS. 26 and 27.

First, in a state in which usual operation is performed as previously described in the first embodiment, if bus reset occurs at step S261 because of connection of a new device or disconnection of an existing device, the control section 39 receives a bus reset signal. After this, the control section 39 sends a control signal to the SYT extraction section 36 so as to check Buffer Size in the buffer.

Upon reception of the control signal, the SYT extraction section 36 checks Buffer Size in the buffer and returns the Buffer Size to the control section 39 at step S262.

After this, all SYTs in the buffer are deleted.

The Buffer Size is the same as that previously described in the first method.

The control section 39 also sends a change signal to the selection circuit 44.

Upon reception of the change signal, the selection circuit 44 changes the reproduction reference clock signal to be supplied to the PLL circuit 37 to the dummy reproduction reference clock signal $C_{REF}'$ from the dummy reproduction reference clock signal $C_{REF}'$ generation circuit 43 at step S263.

At this time, SYT after the bus reset is supplied to the match detection circuit 34, thus the match detection circuit 34 does not output for a while. Therefore, during the time, the dummy reproduction reference clock signal $C_{REF}'$ from the dummy reproduction reference clock signal $C_{REF}'$ generation circuit 43 is supplied to the selection circuit 44.

The control section 39 counts the number of the rising edges of the dummy reproduction reference clock signal $C_{REF}'$ supplied to the selection circuit 44 at step S265. If the count becomes equal to or greater than the Buffer Size at step S265, the control section 39 transmits a change signal to the selection circuit 44.

Upon reception of the change signal, the selection circuit 44 again changes the reproduction reference clock signal to be supplied to the PLL circuit 37 to the normal reproduction reference clock signal $C_{REF}$ at step S266.

On the other hand, if the count of the rising edges of the dummy reproduction reference clock signal $C_{REF}'$ does not become equal to or greater than the Buffer Size at step S265, control goes to step S264 and counting the number of the rising edges of the dummy reproduction reference clock signal $C_{REF}'$, is continued.

After usual reproduction processing is performed at step S266, whether or not bus reset occurs is checked.

If bus reset does not occur at step S261, the usual operation is repeated until bus reset occurs.

Thus, in the second method of the fourth embodiment, a dummy reproduction reference clock signal $C_{REF}'$ is generated after the bus reset, the data stored before the bus reset is processed using the dummy reproduction reference clock signal $C_{REF}'$, and after all the data stored before the bus reset has been processed, processing is performed using the reproduction reference clock signal $C_{REF}$ after the bus reset. Therefore, even if the time information before the bus reset differs from that after the bus reset, normal processing is performed.

The specific generation method of the dummy reproduction reference clock signal $C_{REF}'$ is as follows:

In FIG. 27, the dummy reproduction reference clock signal $C_{REF}'$ generation circuit 43 counts the rising edges of clock periods (FIG. 28) of reproduction reference clock signal $C_{REF}$ generated in the match detection circuit 34 and timings by a counter (not shown) and stores the clock period in a buffer (not shown) in the dummy reproduction reference clock signal $C_{REF}'$ generation circuit 43.

Figure 28:
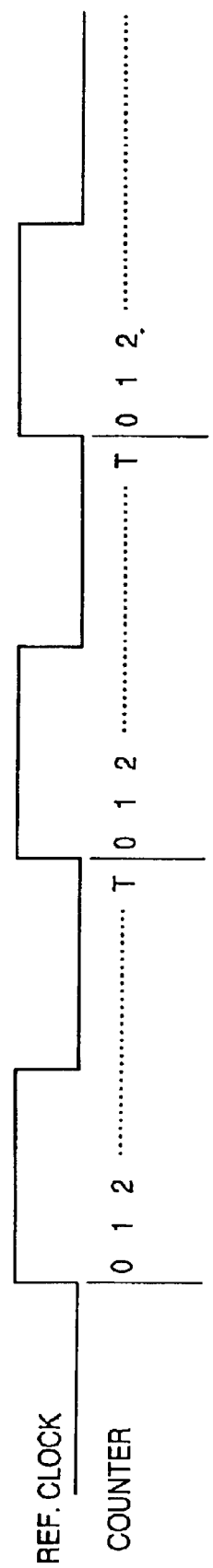
FIG. 28 is a drawing to show clock period of reproduction reference clock signal $C_{REF}$ in the second method of the fourth embodiment of the invention.

In the example shown in FIG. 28, the clock period (T) is stored in the buffer.

Since the counter value is stored in the buffer on the rising edge of the reference clock and then the next period (T) is counted, the counter is adapted to clear the count value and again continue the count operation.

When bus reset occurs in the above-described state, the dummy reproduction reference clock signal $C_{REF}'$, generation circuit 43 generates a dummy reproduction reference clock signal $C_{REF}'$ based on the period stored in the buffer, such as the period (T), and supplies the dummy reproduction reference clock signal $C_{REF}'$ to the selection circuit 44.

The dummy reproduction reference clock signal $C_{REF}'$ is thus generated.

In the second method of the fourth embodiment, the selection circuit 44 changes the reproduction reference clock signal to be supplied to the PLL circuit 37 based on Buffer Size in the buffer in the SYT extraction section 36, but it can also change the reproduction reference clock signal based on Buffer Size in the reception buffer 35. How to find the Buffer Size is not limited to that in the fourth embodiment; any other method may be adopted if the data amount in the buffer can be found. The SYT extraction section 36 determines whether each SYT is an SYT stored before or after bus reset as described later in the fifth embodiment of the invention, and the selection circuit 44 can also change based on the determination result.

As described above, in the first and second methods of the fourth embodiment, the data stored before the bus reset and that stored after the bus reset are processed normally without losing the data before and after the bus reset.

(Fifth Embodiment)

Figure 29A:
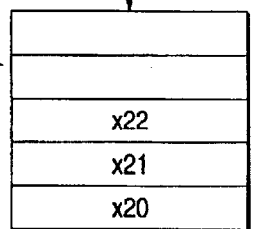
FIGS. 29A and 29B are schematic drawings to show a fifth embodiment of the invention.
Figure 29B:
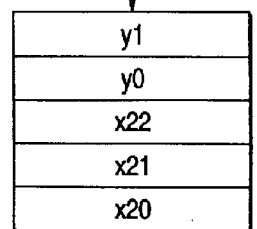

FIGS. 29A and 29B are drawings to schematically show the method of (5) described above.

The buffer state in an SYT extraction section 36 in FIGS. 29A and 29B is the same as that in the first embodiment. FIG. 29A shows the state of a buffer in the SYT extraction section 36 just after bus reset in a receiving party operating at cycle time CT=X and FIG. 29B shows the buffer state after the method (5) is executed.

That is, since transmission and reception are executed at cycle time CT=X before bus reset, SYTs of x20, x21, and x22 are stored in the buffer in the SYT extraction section 36 (FIG. 29A).

After this, if bus reset occurs and the cycle time on the bus becomes CT=Y, the SYT extraction section 36 inputs new SYT as usual.

After input of new SYTs, SYTs at cycle time CT=X and SYTs at cycle time CT=Y are stored as x20, x21, and x22 and y0, y1, y2, y3 . . . in the buffer in the SYT extraction section 36 (FIG. 29B).

A difference between the preceding and following SYTs is calculated in the buffer and whether each SYT is an SYT stored before or after bus reset is determined according to the difference. Based on the determination result, demodulation processing is performed at cycle time CT=X for the data stored before bus reset; demodulation processing is performed at cycle time CT=Y for the data stored after bus reset.

Thus, in the fifth embodiment, demodulation processing is performed at cycle time CT=X for the data stored before bus reset and demodulation processing is performed at cycle time CT=Y for the data stored after bus reset.

Figure 30:
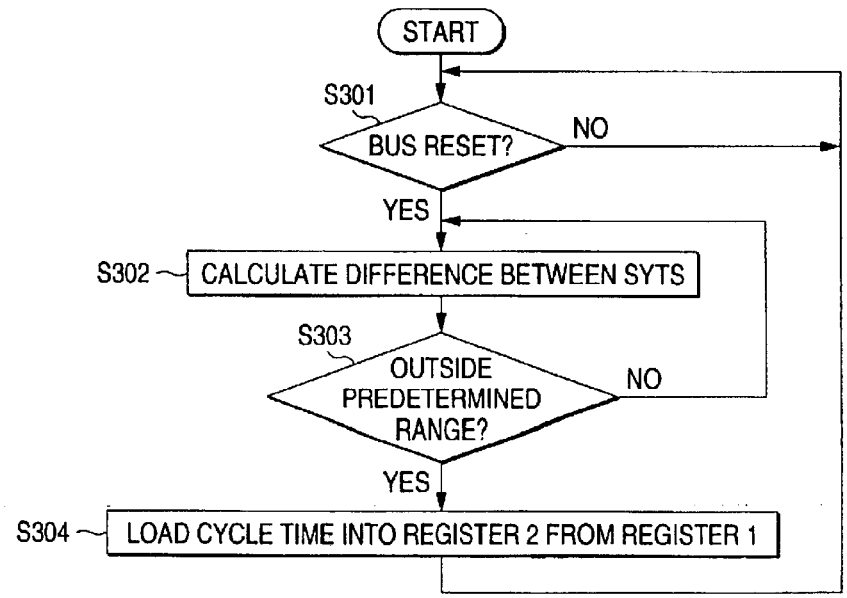
FIG. 30 is a flowchart to show the fifth embodiment of the invention.

FIG. 30 is a flowchart to show the receiver state described above. FIG. 31 is a block diagram provided by extracting the portion related to the fifth embodiment from the block diagram of FIG. 11. Circuit parts identical with or similar to those previously described with reference to FIG. 11 are denoted by the same reference numerals in FIG. 31 and will not be discussed again.

The fifth embodiment further includes a subtraction circuit 45 and a determination circuit 46. A cycle timer 33 has two registers for temporarily retaining data.

The subtraction circuit 45 receives SYTs from the SYT extraction section 36, calculates a difference between the preceding and following SYTs according to a calculation expression described later, and supplies the time difference to the determination circuit 46 as the time difference (D).

The determination circuit 46 receives the time difference (D) from the substraction circuit 45, determines whether each SYT is an SYT stored before or after bus reset by a method described later based on the time difference (D), and supplies the determination result to a control section 39.

The specific method of the fifth embodiment will be discussed with reference to FIGS. 30 and 31.

First, in a state in which data is transmitted and received on a bus 15 by at least two nodes, a cycle start packet extraction section 31 extracts a data packet from the bus 15 and supplies extracted cycle start packet CS to the cycle timer 33, which then sets the cycle time indicated in the cycle start packet CS in a register 1, for example, generates cycle time of the home device based on the setup cycle time, and supplies the generated cycle time to a match detection circuit 34.

On the other hand, a data packet extraction section 32 extracts an isochronous packet on the bus 15 and feeds data in the packet into a reception buffer 35. The SYT extraction section 36 extracts SYT contained in a CIP header in the isochronous packet.

The subtraction circuit 45 calculates a time difference (D) between the extracted SYTs according to the calculation expression described later, and supplies the time difference (D) to the determination circuit 46.

The determination circuit 46 receives the time difference (D) from the substraction circuit 45, determines whether the SYT is an SYT stored before or after bus reset by the method described later based on the time difference (D), and supplies the determination result to the control section 39.

After this, data demodulation processing is performed in data reception processing described above.

If bus reset occurs at step S301 because of connection of a new device or disconnection of an existing device while data is being transferred, the control section 39 receives a bus reset signal. After this, the control section 39 transmits a control signal to the cycle timer 33 for instructing the cycle timer 33 to store a new cycle time in another register. Upon reception of the control-signal, the cycle timer 33 writes a new cycle time into a second register 2, for example.

At this time, the cycle timer 33 generates the cycle time of the home device based on the cycle time stored in the register 1 and continues to supply the value of the generated cycle time to the match detection circuit 34.

The match detection circuit 34 uses the cycle time from the cycle timer 33 and SYT supplied from the SYT extraction section 36 to generate a reproduction reference clock signal $C_{REF}$.

On the other hand, the subtraction circuit 45 receives SYTs from the SYT extraction section 36, calculates a time difference between the received SYTs, and transmits the time difference to the determination circuit 46 at step S302.

The determination circuit 46 stores the time difference supplied from the subtraction circuit 45 and compares the time difference with the preceding time difference to determine whether or not the difference value between the time differences is within a predetermined range described later at step S303. If the value is within the predetermined range, usual processing is continued.

On the other hand, if the value is outside the predetermined range, the determination circuit 46 transmits a control signal to the control section 39.

Upon reception of the control signal, the control section 39 transmits a control signal to the cycle timer 33 for instructing the cycle timer 33 to rewrite cycle time. Upon reception of the control signal, the cycle timer 33 rewrites the cycle time stored in the register 2 into the register 1 at step S304, generates the cycle time of the home device based on the cycle time, and supplies the generated cycle time to the match detection circuit 34.

After the cycle time rewrite is executed at step S304, usual operation is repeated until bus reset occurs.

If bus reset does not occur at step S301, usual operation is also repeated until bus reset occurs.

Thus, in the fifth embodiment, two or more registers for reflecting the cycle times before and after bus reset are provided in the receiving party. After the bus reset, the data stored before the bus reset is processed using the cycle time before the bus reset and after the data stored before the bus reset has been all processed, usual processing is performed using the cycle time after the bus reset, so that data demodulation is executed without losing data.

The specific calculation method of the subtraction circuit 45 for calculating the time difference (D) between SYTs and the determination method of the determination circuit 46 are as follows:

The SYTs shown in FIG. 29B are supplied from the SYT subtraction section 36 to the subtraction circuit 45, which then uses the SYTs to calculate the time difference (D) as the following expression (3) and supplies the time difference (D) to the determination circuit 46.

$$\text{Time difference } (D) = \text{current } SYT - \text{immediately preceding } SYT \quad (3)$$

The determination circuit 46 detects the boundary between the SYT before bus reset and that after bus reset based on the time difference (D) and transmits the detection result to the control section 39. That is, the time difference (D') between the SYTs preceding and following the boundary differs from the time difference (D) between other SYTs, thus the SYTs between which the time difference (D') is found become the SYT before the bus reset and the SYT after the bus reset.

More specifically, in FIG. 29B, the subtraction circuit 45 calculates the time difference (D) as the following expressions (4) to (6):

$$\text{Time difference } (D) = x21 - x20 \quad (4)$$
$$= a$$

$$\text{Time difference } (D) = x22 - x21 \quad (5)$$
$$= a$$

$$\text{Time difference } (D) = y0 - x22 \quad (6)$$
$$= b$$

At this time, the calculation results of (Expression 4) and (Expression 5) on the SYTs added when cycle time CT=X are each predetermined time difference (a). Just after bus reset, calculation is executed on SYT added when cycle time CT=X and SYT added when cycle time CT=Y. Thus, if the reference time before the bus reset differs from that after the bus reset, predetermined time difference (b) results. Therefore, the above-described boundary is detected by comparing the time difference values. In the example, the predetermined time difference calculated on the SYTs added when cycle time CT=X is (a); in fact, however, the time difference also contains a little jitter component α and therefore if it is compared with any other time difference, it is advisable to adopt a ±α.

The SYT before the bus reset and that after the bus reset are thus determined.

In the fifth embodiment, register change in the cycle timer 33 is made based on the determination result of the determination circuit 46, but it can also be made based on Buffer Size in either or both of the SYT extraction section 36 and the reception buffer as described above.

Thus, in the invention, digital data sent by a transmitting party can be restored to a state in which it can be reproduced immediately at proper timing in a receiving party.

Although the non-blocking transfer method (in which conversion to a packet is executed in one Iso cycle unit), one of transmission methods defined in A&M protocol, has been described, but the invention can also be applied to a blocking transfer method (in which conversion to a packet is executed in a predetermined number of sample units). It can also be applied at any other sampling frequency than 32 KHz.

In the invention, the time at which the reference time on the transmission bus changes is the time at which bus reset occurs. However, if bus reset does not occur, for example, when the cycle master node changes the reference time, the methods of the invention can be applied.

In the embodiments, predetermined data is reproduced by the reception interface circuit 12, 13 according to the invention; the data to be reproduced may be video data or voice data. In the embodiments, the operation performed when the reception interface circuit 12, 13 is adopted for the transmission system complying with the IEEE1394-1995 standard has been described, but applicable transmission systems are not limited to those complying with the IEEE1394-1995 standard.

In short, the invention may be applied to a reception interface unit in such a transmission system wherein time series data such as voice data or video data is divided into data groups and a data packet comprising reproduction specification time data (specifying the time at which each data piece in the data groups should be reproduced in a receiving party) added to the data groups is transmitted in a time division manner.

As was described above, in the invention, digital data sent by a transmitting party can be restored to a state in which it can be reproduced immediately at proper timing in a receiving party.

What is claimed is:

1. A reception interface unit in a transmission system wherein time series data is divided into data groups and a data packet including reproduction specification time data specifying a time at which each data piece in the data groups should be reproduced, added to the data groups is transmitted on a transmission bus in a time division manner, said reception interface unit comprising:

a cycle timer for counting a reference time of a home device based on a reference time on the transmission bus;

a reproduction specification time data extraction means for extracting the reproduction specification time data in the data groups from a signal received via the transmission bus and storing the reproduction specification time data in a buffer;

a reception buffer for inputting and storing the data pieces in the data groups in order and reading out the data pieces in the storage order in response to a reproduction clock; and recovery means for processing the signal received when the reference time of the home device does not match the reproduction specification time.

2. The reception interface unit as claimed in claim 1, wherein the recovery means deletes all the data stored in the reproduction specification time data extraction means and the reception buffer when the reference time on the transmission bus is changed.

3. The reception interface unit as claimed in claim 1, wherein when the reference time on the transmission bus changes, the recovery means interrupts transmitting the data to the reception buffer until the data stored in the reception buffer before the change of the reference time is processed.

4. The reception interface unit as claimed in claim 1, wherein the recovery means deletes all the reproduction specification time data stored in the buffer when the reference time on the transmission bus is changed.

5. The reception interface unit as claimed in claim 1, wherein the recovery means process the data stored before the change of the reference time using a dummy reproduction specification time data when the reference time on the transmission bus is changed.

6. The reception interface unit as claimed in claim 1, wherein the recovery means process the data stored before the change of the reference time using the reference time previously received before the change of the reference time, when the reference time on the transmission bus is changed.

7. The reception interface unit as claimed in claim 1, wherein the recovery means receives a transmission bus reset signal if a new device is connected to the transmission bus while data is being transferred or if an existing device is disconnected from the transmission bus while data is being transferred.

8. The reception interface unit as claimed in claim 7, wherein when the recovery means receives the transmission bus reset signal, the recovery means sends a control signal to said cycle timer instructing said cycle timer to store a new cycle time.

9. The reception interface unit as claimed in claim 1, wherein said cycle timer has a first register and a second register for temporarily storing data.

10. A reception interface unit in a transmission system wherein time series data is divided into data groups and a data packet including reproduction specification time data specifying a time at which each data piece in the data groups should be reproduced, added to the data groups is transmitted on a transmission bus in a time division manner, said reception interface unit comprising:

a cycle timer which counts a reference time of a home device based on a reference time on the transmission bus;

a reproduction specification time data extraction circuit which extracts the reproduction specification time data in the data groups from a signal received via the transmission bus and stores the reproduction specification time data in a buffer;

a reception buffer which inputs and stores the data pieces in the data groups in order and reads out the data pieces in the storage order in response to a reproduction clock; and a recovery circuit which processes the signal received when the reference time of the home device does not match the reproduction specification time.

11. The reception interface unit as claimed in claim 10, wherein the recovery circuit deletes all the data stored in the reproduction specification time data extraction circuit and the reception buffer when the reference time on the transmission bus is changed.

12. The reception interface unit as claimed in claim 10, wherein when the reference time on the transmission bus changes, the recovery circuit interrupts transmitting the data to the reception buffer until the data stored in the reception buffer before the change of the reference time is processed.

13. The reception interface unit as claimed in claim 10, wherein the recovery circuit deletes all the reproduction specification time data stored in the buffer when the reference time on the transmission bus is changed.

14. The reception interface unit as claimed in claim 10, wherein the recovery circuit process the data stored before the change of the reference time using a dummy reproduction specification time data when the reference time on the transmission bus is changed.

15. The reception interface unit as claimed in claim 10, wherein the recovery circuit processes the data stored before the change of the reference time using the reference time previously received before the change of the reference time, when the reference time on the transmission bus is changed.

16. The reception interface unit as claimed in claim 10, wherein the recovery circuit receives a transmission bus reset signal if a new device is connected to the transmission bus while data is being transferred or if an existing device is disconnected from the transmission bus while data is being transferred.

17. The reception interface unit as claimed in claim 16, wherein when the recovery circuit receives the transmission bus reset signal, the recovery circuit sends a control signal to said cycle timer instructing said cycle timer to store a new cycle time.

18. The reception interface unit as claimed in claim 10, wherein said cycle timer has a first register and a second register for temporarily storing data.

* * * * *